US012131090B1

(12) United States Patent
Anderson et al.

(10) Patent No.: US 12,131,090 B1
(45) Date of Patent: Oct. 29, 2024

(54) METHODS AND APPARATUS TO FACILITATE USER INTERACTION ACROSS MULTIPLE COMPUTING SYSTEMS

(71) Applicant: Intel Corporation, Santa Clara, CA (US)

(72) Inventors: Glen J. Anderson, Beaverton, OR (US); Maria Lourdes Pitallano, San Mateo, CA (US); Aleksander Magi, Portland, OR (US); Stanley Jacob Baran, Chandler, AZ (US); David Michael Woods, El Dorado Hills, CA (US); Passant V. Karunaratne, Chandler, AZ (US); Michael Daniel Rosenzweig, Queen Creek, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/241,038

(22) Filed: Aug. 31, 2023

(51) Int. Cl.
*G06F 3/14* (2006.01)
*G06F 9/451* (2018.01)

(52) U.S. Cl.
CPC ............... *G06F 3/14* (2013.01); *G06F 9/451* (2018.02)

(58) Field of Classification Search
CPC ................................. G06F 3/14; G06F 9/451
See application file for complete search history.

(56) References Cited

U.S. PATENT DOCUMENTS

| | | | | |
|---|---|---|---|---|
| 8,736,583 B2* | 5/2014 | Anderson | ........... | G06F 3/04883 345/175 |
| 9,360,933 B2* | 6/2016 | Anderson | ............... | G06F 3/017 |
| 10,366,291 B2* | 7/2019 | Nowak-Przygodzki | ..................... | G06F 3/0481 |
| 11,722,550 B2* | 8/2023 | Lv | ........................... | G06F 9/452 |
| 11,755,170 B2* | 9/2023 | Sukhyani | .............. | G06F 3/0481 709/203 |
| 11,811,876 B2* | 11/2023 | Berliner | ................ | G06T 19/006 |
| 11,924,283 B2* | 3/2024 | Berliner | ................ | H04L 63/102 |
| 2016/0291915 A1* | 10/2016 | Panchapakesan | ..... | G06F 3/1454 |
| 2019/0180242 A1* | 6/2019 | Pai | ........................ | G06Q 10/101 |
| 2020/0036816 A1* | 1/2020 | Babu J D | ............ | G02B 27/017 |
| 2020/0241934 A1* | 7/2020 | Shah | ........................ | G06F 9/547 |
| 2020/0293169 A1* | 9/2020 | Hu | .......................... | G06F 3/0484 |
| 2021/0092172 A1* | 3/2021 | Lo | ........................... | G06F 3/1454 |
| 2021/0241532 A1* | 8/2021 | Daniels | ................. | G06T 19/006 |
| 2022/0400141 A1* | 12/2022 | Curry | .................... | G06F 16/176 |
| 2023/0342100 A1* | 10/2023 | Wawruch | .............. | G06T 19/006 |

* cited by examiner

*Primary Examiner* — Vinh T Lam
(74) *Attorney, Agent, or Firm* — Hanley, Flight & Zimmerman, LLC

(57) ABSTRACT

Systems, apparatus, articles of manufacture, and methods to facilitate user interaction across multiple computing systems are disclosed. An example apparatus includes interface circuitry, machine readable instructions, and programmable circuitry to at least one of instantiate or execute the machine readable instructions to, cause content to be provided to a host computing system to present the content via a display, access an edit instruction from a user of the apparatus, the edit instruction to cause a change of the content, and cause the edit instruction to be provided to the host computing system to apply the change to the content presented on the display.

20 Claims, 18 Drawing Sheets

METHODS AND APPARATUS TO FACILITATE USER INTERACTION ACROSS MULTIPLE COMPUTING SYSTEMS

FIELD OF THE DISCLOSURE

This disclosure relates generally to computing systems and, more particularly, to methods and apparatus to facilitate user interaction across multiple computing systems.

BACKGROUND

In recent years, user interfaces for computing systems have grown in complexity. A user interface for image editing may include a main section that displays an image being edited, and a number of tools and/or sections of tools that may be used to control the editing of the image.

Figure 1A:
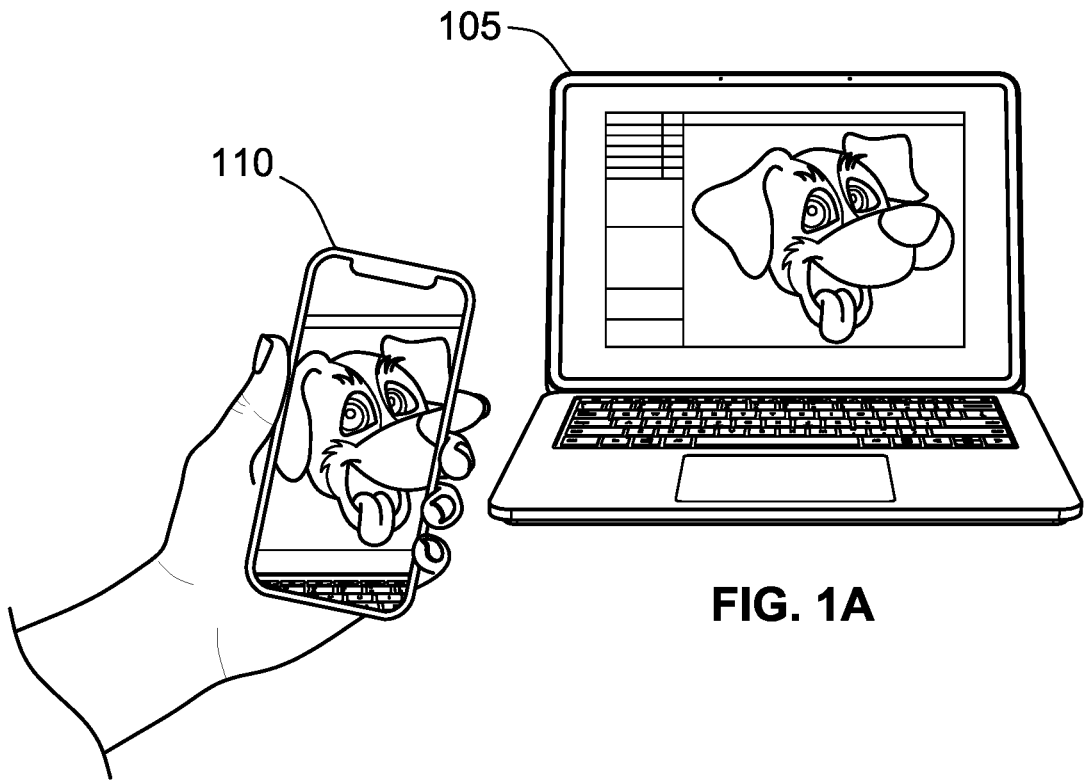
FIGS. 1A, 1B, 1C, 1D, and 1E illustrate an example progression of user interactions to establish a region of interest for display on a remote device.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Within a computing environment, control of a user's supplemental screen(s) in relation to a main display is challenging. In some examples, a user may want to simply overlay a second screen to view aspects of a user interface of a main display. For example, a user may wish to select a portion of an image to display on a secondary screen while the full image is displayed on the main display. Such functionality is currently unavailable in existing systems. In existing systems, when using a second display, the user must either duplicate screens or extend screens from an operating system (OS) level. Or, if an application offers screen sharing, the user may share another application, or, a window/display specifically. In other words, there are no existing solutions that provide the user flexibility to view a user interface of a main PC screen on a second display for specific regions of interest (ROI).

Examples disclosed herein enable a user to view a main display and/or a portion of a main display on a second display. In examples disclosed herein, the second display may be operated by a device (e.g., a remote device) different from the device hosting the main display (e.g., a host device). For example, the remote device may be implemented using a smartphone or a tablet, and may enable a user to view and/or interact with a region of interest displayed at both the main display and the second display. In examples disclosed herein, this region of interest may be defined in connection with an application executed on the host device. In some examples, the region of interest may be defined as a region of the display of the host device (e.g., irrespective of which application(s) are included in the region of interest). In some examples, an application on the remote device may be able to use data from the region of interest. For example, if an email address, phone number, or the like, is in the region of interest, an application on the remote device may be able to open an email message (e.g., via an email client), a text message thread, and/or place a phone call based on the data from the region of interest.

Examples disclosed herein enable a dynamic "digital monocle" for the end user to seamlessly frame a region of interest for their main screen onto their second display or multi-display user interface. Using display information, such as an aspect ratio of the second display, a host device can provide controls for the end user to view and/or control a desired output onto the second screen, either by controlling an on-screen user-interface (UI) of the second screen manually, or, using a selective view driven, for example, by the user holding up the second screen to the main display. For example, a camera of the remote device may be used to capture an image of the user interface of the host device. The remote device can subsequently utilize the captured image to identify the region of interest. The user can then adjust the region of interest accordingly to their preference or snap to a most relevant area of interest (e.g., an application, to scale or to ratio).

Once the region of interest is established, this can be extended in a manner such that the secondary/smaller display snaps to and takes control of an application ribbon and/or other control areas of the host device that include, for example, drop-down menus of the application (in some examples, thereby also eliminating the visibility of such user interface elements on a primary and/or larger display of the host device and, as a result, allowing for the primary and/or larger display to be better utilized). Such an approach allows the user to utilize a secondary and/or smaller display, and its associated input devices, to select functionality within the application and/or for the primary/larger display to act as the creative or working surface for the application without sacrificing display area for aspects associated with control.

In some examples, the secondary display may be used as a focused working surface, for example allowing a user to work on or manipulate the creative/working surface at a higher zoom ratio than on the primary display, while at the same time allowing the user to view the effects of the focused work or manipulation in the primary (e.g., non-zoomed) display on the complete creative/working surface within the application. In some examples, labeling for control and interaction can be provided within the display ecosystem. In some examples, pairing/connection and/or re-connection procedures may be utilized to ensure a smooth user experience.

In addition to facilitating remote display of a portion of a user interface (and/or facilitating interaction therewith), examples disclosed herein enable content to be provided from a first device (e.g., the remote device) to a second device (e.g., the host device). For example, a user may paste an image from a smartphone (e.g., a first device) into a document being edited on a laptop (e.g., a second device). The user may subsequently change the size of the pasted image by moving the first device with respect to the second device. In some examples, the user may utilize classic gesture controls on the first device to manipulate the image on the second device such as, for example, pinch to zoom. A subsequent relationship between the content on the first device and the second device can be maintained indefinitely after the transition of content. This accomplishes some of the same goals as "traditional" cloud-based content but maintains the device transition history to allow subsequent user experiences, such as using the phone again later to edit the content via gestures or finding the content on one device while looking at it on another.

FIGS. 1A, 1B, 1C, 1D, and 1E illustrate an example progression of user interactions to establish a region of interest for display on a remote device. In the illustrated example of FIG. 1A, a display of a host device 105 (e.g., a personal computer (PC) or tablet) is captured using a camera of a remote device 110 (e.g., a smartphone). In the illustrated example of FIG. 1A, because the user is pointing the camera of the remote device 110 towards the display of the host device 105, the camera captures a portion of the user interface.

Figure 1B:
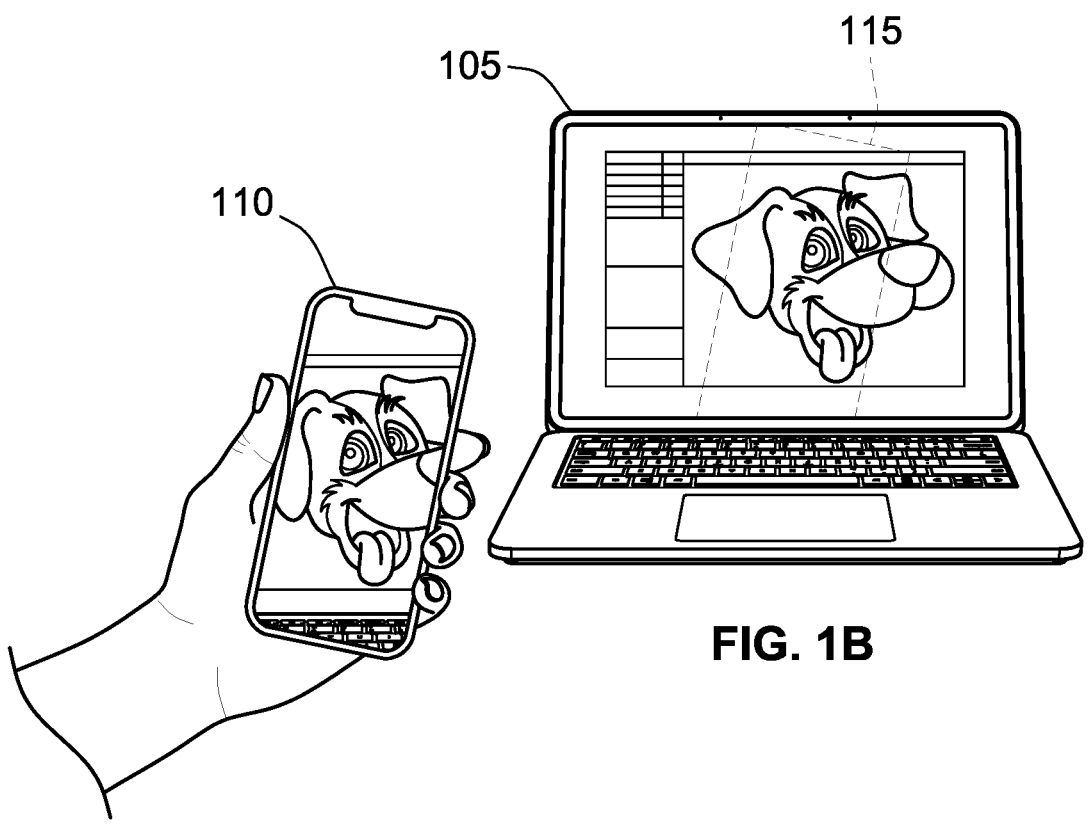

In FIG. 1B, the portion of the user interface captured by the camera of the remote device 110 is identified. The identified portion is represented by dotted lines 115 overlaid on the display of the host device 105. While in the illustrated example of FIG. 1B, dotted lines are used to display the captured portion, any other information may be displayed to represent such captured portion. In some examples, no information may be displayed. The visual marks (e.g., the dotted lines 115) enable the user to easily see what area of the display is being captured by the remote device. As a result, the user can view the screen on the remote device and/or the screen of the host device 105 as visual clues when capturing the portion.

Because, in some examples, different angles and/or vantage points may be used to capture the image of the display of the host device, the host device may determine a proposed region of interest 118. In the illustrated example of FIG. 1C, the proposed region of interest 118 is based on the identified portion of the user interface (e.g., from the identified portion of FIG. 1B). However, any other information may additionally or alternatively be used to identify the proposed region of interest 118 including, for example, an application and/or user-interface that occupies a most significant portion of the identified portion 115, an application and/or user-interface that is nearest a center of the identified portion 118, an aspect ratio of the remote device 110. The proposed region of interest need not correspond to the exact area displayed on the remote device size, orientation, etc. A confirmation dialog may be displayed to the user to enable the user to approve or deny the proposed region of interest 118. If the proposed region of interest is not approved, the user may modify the region of interest (e.g., via the host device 105), may re-position the remote device 110 to capture a new image, etc. to select a desired region of interest. In the illustrated example of FIG. 1C, the proposed region of interest 118 is selected to match the aspect ratio of the display of the remote device 110. However, in some examples, the proposed region of interest 118 may be selected based on an application that is included in the captured image of FIG. 1B.

Figure 1C:
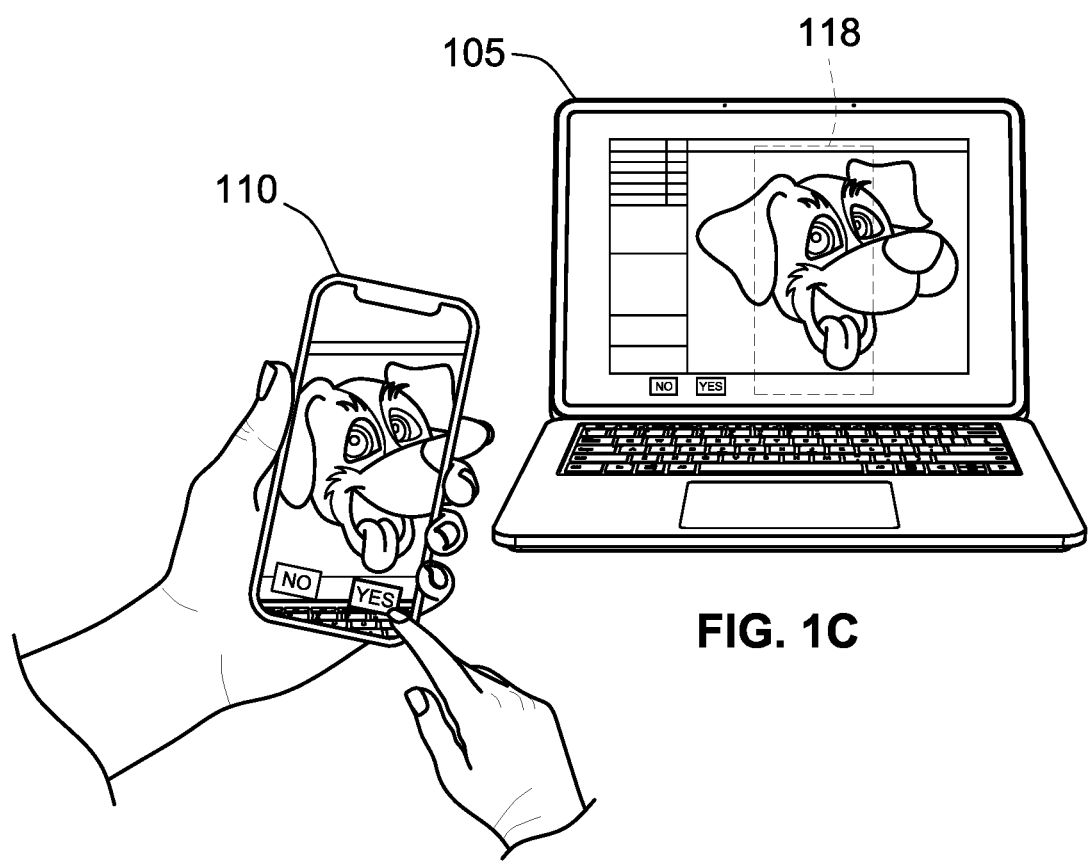
Figure 1D:
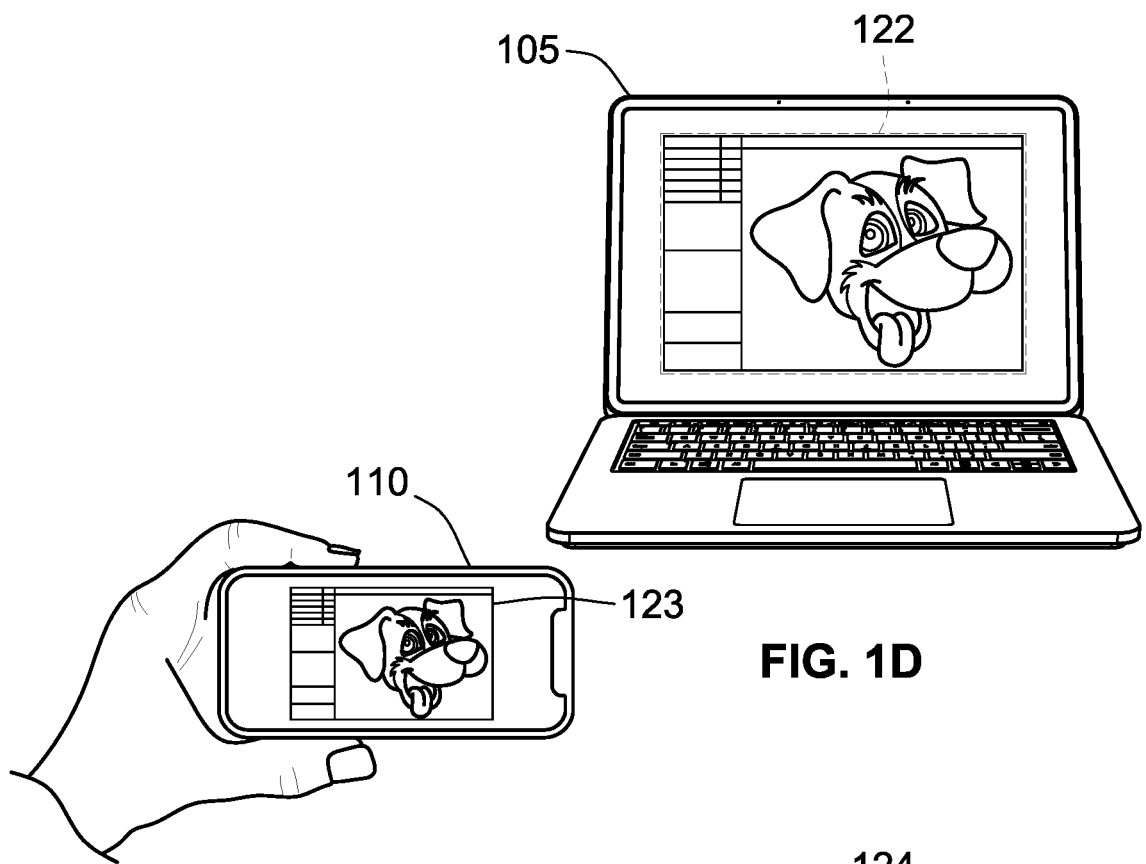
Figure 1E:
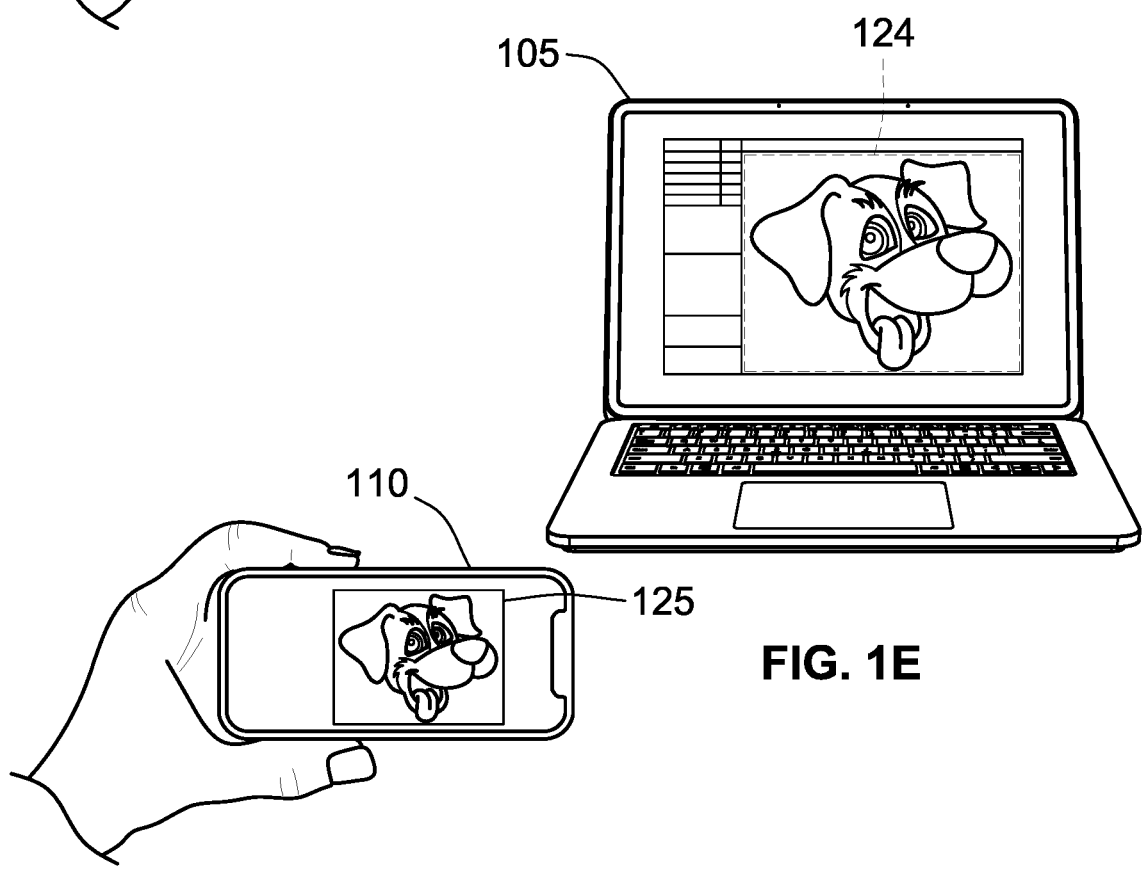

For example, in the illustrated example of FIG. 1D, the user interface of the application 122 that was captured is selected as the region of interest, and is consequently displayed 123 on the remote device 110. Alternatively, a portion 124 (e.g., less than the entirety) of the user interface of the displayed application may be selected for display 125 on the remote device 110, as is illustrated in FIG. 1E. In the illustrated examples of FIGS. 1D and 1E, the remote device 110 is rotated into a horizontal or landscape orientation. However, in some examples the remote device 110 is not rotated into a landscape orientation. Moreover, any orientation may additionally or alternatively be used including "skewed" orientations that are not traditional "landscape" or "portrait" orientations. For example, the remote device may be oriented at a forty-five degree angle (e.g., intermediate a portrait orientation and a landscape orientation) with respect to the host device. Regardless of the orientation, the user interface may be scaled, cropped, transformed, etc. to allow interaction with the host device and/or an application on the host device via the remote device.

Figure 2:
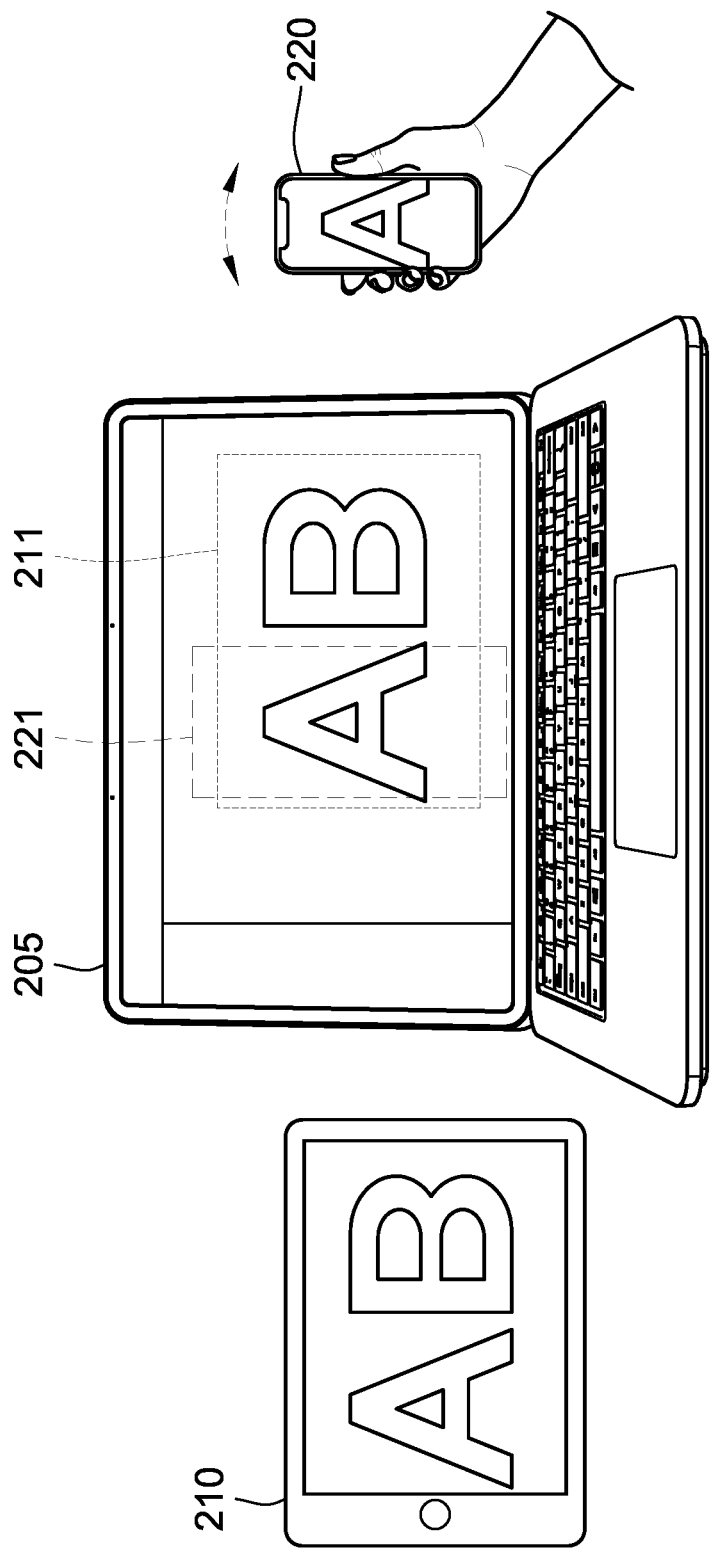
FIG. 2 illustrates an example in which multiple remote devices are used to display a user interface from a host device.

In some examples, multiple remote devices may be used. FIG. 2 illustrates an example in which multiple remote devices 210, 220 are used to display a user interface from a host device 205. As illustrated in FIG. 2, a first remote device 210 displays a first region of interest 211, while a second remote device 220 displays a second region of interest 221. In the illustrated example of FIG. 2, the regions of interest 211, 221 partially overlap. However, such regions of interest 211, 221 are independent of each other and need not have any overlap. Thus, in some examples, the region of interest 211 for the first remote device 210 may be selected as an image being edited (e.g., within an image editor software, while the second remote device 220 may show a menu and/or tool pallet within the image editor software.)

While the illustrated example of FIG. 2 is shown in the context of a single user controlling a host device 205 using a first remote device 210 and a second remote device 220, in some examples, the remote devices 210, 220 may be operated by different users. In such a multi-user scenario, a first user operating the first remote device 210 may be presented with a first region of interest 211, while a second user operating the second remote device (e.g., ROI 220) may be presented with a second region of interest (e.g., ROI 221). In such an example, the first and second users may select their respective regions of interest. However, in some other examples, the region(s) of interest shared to remote devices may be controlled by a user of the host device 205 (e.g., a user different than the first user and/or the second user). In some examples, the user of the host device 205 may indicate that both the first user and the second user are to be presented the same region of interest. The remote devices may then allow viewing of the region of interest as identified by the user of the host device 205

In some examples, the user of the host device 205 may indicate that the sharing of the region(s) of interest is to be done in a view-only mode, such that the users of the remote devices are not allowed to interact and/or edit the content displayed via the region of interest, but are able to view the region of interest. In some examples, within the view-only mode, the users of the remote devices are able to scroll and/or zoom within their respective region(s) of interest.

In some examples, the user of the host device 205 may enable one or more users to interact with a provided region of interest. Such interaction and/or edits as a result of the interaction may then be relayed to other remove devices. In some examples, such edits might remain local (e.g., as an overlay) to the host device and the remote device supplying the edits. In other words, an edit (e.g., highlighting of displayed text, an annotation, etc.) might be displayed only at the device making the edit and the host device.

Figure 3:
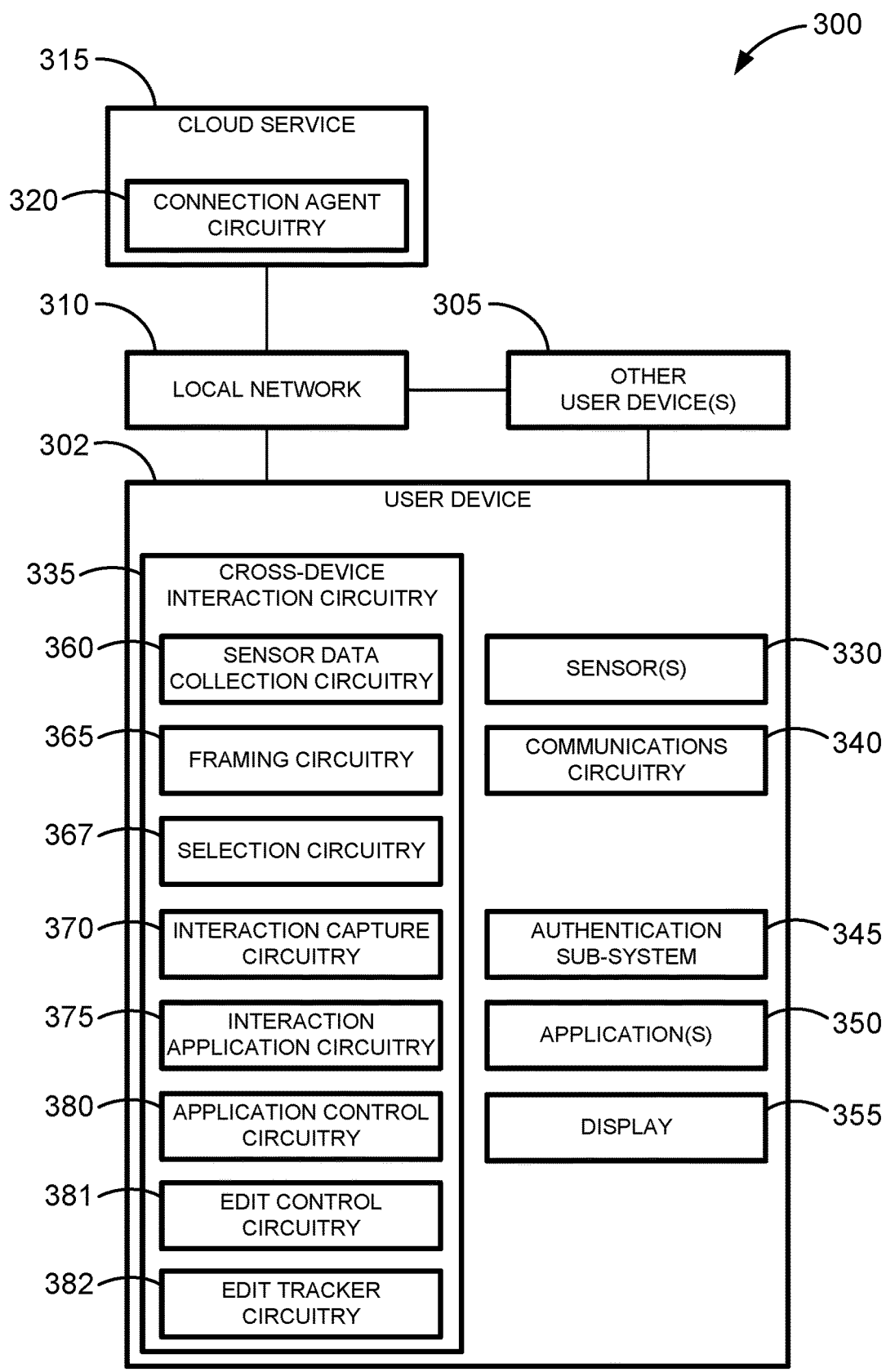
FIG. 3 is a block diagram of an example implementation of an example user device.

FIG. 3 is a block diagram of an example implementation of an example user device 302. The example user device 302 corresponds to the host device 105 FIGS. 1A, 1B, 1C, 1D, and/or 1E, the host device 205 of FIG. 2, the remote device 110 of FIGS. 1A, 1B, 1C, 1D, and/or 1E, and/or the remote device(s) 210, 220 of FIG. 2. The example user device 302 communicates with other user device(s) 305 and/or a local network 310. Like the example user device 302, in the illustrated example of FIG. 3, the other user device(s) 305 represents the host device 105 FIGS. 1A, 1B, 1C, 1D, and/or 1E, the host device 205 of FIG. 2, the remote device 110 of FIGS. 1A, 1B, 1C, 1D, and/or 1E, and/or the remote device(s) 210, 220 of FIG. 2. For example, whereas the user device 302 may represent the remote device 110, the example other device 305 may represent the host device 105. Conversely, when the user device 302 represents the host device 105, the example other device 305 may represent the remote device 110.

The example user device 302 of the illustrated example of FIG. 3 includes cross-device interaction circuitry 335, sensors 330, communications circuitry 340, an authentication sub-system 345, one or more application(s) 350, and a display 355. In general, the example user device 302 may be implemented by any type and/or form factor of computing device including, for example, a tablet, a smartphone, a laptop computer, a desktop computer, a server, etc.

The example cross-device interaction circuitry 335 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the cross-device interaction circuitry 335 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The example cross-device interaction circuitry 335 includes sensor data collection circuitry 360, framing circuitry 365, selection circuitry 367, interaction capture circuitry 370, interaction application circuitry 375, application control circuitry 380, edit control circuitry 381, and edit tracker circuitry 382. In examples disclosed herein, the components of the example cross-device interaction circuitry 335 may also be instantiated by programmable circuitry, an ASIC, an FPGA, microprocessor circuitry, and/or any combination thereof.

The example sensor data collection circuitry 360 of the illustrated example of FIG. 3 communicates with the sensor(s) 330 (e.g., a camera) to capture an image. The capturing of the image may, in some examples, be in response to a user indicating that the display of the host device is framed by the sensor appropriately (e.g., the user may tap the screen to initiate a capture). For example, as illustrated in FIG. 1B, the sensor(s) of the remote device 110 are oriented to capture at least a portion 115 of the display of the host device 105. In some examples, the capturing of the image may be in response to expiration of a timer.

In some examples, the cross-device interaction circuitry 335 includes means for sensing. For example, the means for sensing may be implemented by sensor data collection circuitry 360. In some examples, the sensor data collection circuitry 360 may be instantiated by programmable circuitry such as the example programmable circuitry 1112 of FIG. 11. For instance, the sensor data collection circuitry 360 may be instantiated by the example microprocessor 1200 of FIG. 12 executing machine executable instructions such as those implemented by at least block 620 of FIG. 6. In some examples, sensor data collection circuitry 360 may be instantiated by hardware logic circuitry, which may be implemented by an ASIC, XPU, or the FPGA circuitry 1300 of FIG. 13 configured and/or structured to perform operations corresponding to the machine readable instructions. Additionally or alternatively, the sensor data collection circuitry 360 may be instantiated by any other combination of hardware, software, and/or firmware. For example, the sensor data collection circuitry 360 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example framing circuitry 365 of the illustrated example of FIG. 3 provides a captured image from a remote device to a host device. In some examples, additional information, such as screen attributes are additionally provided to the host device. The framing circuitry 365, when implemented at the host device, receives the captured image and/or screen attributes from the remote device. Such information is used in some examples by the selection circuitry 367 for identifying a proposed interaction zone and/or region of interest.

In some examples, the cross-device interaction circuitry 335 includes means for framing. For example, the means for framing may be implemented by framing circuitry 365. In some examples, the framing circuitry 365 may be instantiated by programmable circuitry such as the example programmable circuitry 1112 of FIG. 11. For instance, the framing circuitry 365 may be instantiated by the example microprocessor 1200 of FIG. 12 executing machine executable instructions such as those implemented by at least block 625 of FIG. 6. In some examples, framing circuitry 365 may be instantiated by hardware logic circuitry, which may be implemented by an ASIC, XPU, or the FPGA circuitry 1300 of FIG. 13 configured and/or structured to perform operations corresponding to the machine readable instructions. Additionally or alternatively, the framing circuitry 365 may be instantiated by any other combination of hardware, software, and/or firmware. For example, the framing circuitry 365 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example selection circuitry 367 of the illustrated example of FIG. 3 analyzes the captured image in association with information being displayed via the display 355 of the host device 105, and applications displayed on the display 355, to identify a proposed interaction zone/region of interest, and reply to the remote device 110 with an indication of the proposed interaction zone/region of interest. In some examples, the proposed interaction zone represents a portion of the display without respect to locations of applications displayed. In some examples, the selection circuitry 367 may perform a snap-to-application to select the proposed interaction zone 118. The example selection circuitry 367 may, for example query an operating system application programming interface (API) to understand locations of windows and/or other application user interface objects displayed on the display.

In some examples, the cross-device interaction circuitry 335 includes means for selecting. For example, the means for selecting may be implemented by the example selection circuitry 367. In some examples, the selection circuitry 367 may be instantiated by programmable circuitry such as the example programmable circuitry 1112 of FIG. 11. In some examples, selection circuitry 367 may be instantiated by hardware logic circuitry, which may be implemented by an ASIC, XPU, or the FPGA circuitry 1300 of FIG. 13 configured and/or structured to perform operations corresponding to the machine readable instructions. Additionally or alternatively, the selection circuitry 367 may be instantiated by any other combination of hardware, software, and/or firmware. For example, the selection circuitry 367 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example interaction capture circuitry 370 of the illustrated example of FIG. 3 captures user interaction with the user device. In some examples, the interaction capture circuitry 370 at a remote device causes display of the interaction zone provided by the host device. The example interaction capture circuitry 370 determines whether to update the image of the interaction zone. The determination of whether to update the interaction zone may be based on, for example, whether a new image of the interaction zone has been received. For example, the host device 105 may periodically provide an updated image of the interaction zone. In some examples, the interaction zone might be relatively static (e.g., unchanged over time), in which case, the image of the interaction zone might be provided by the host device in response to a detected change in the interaction zone. In some examples, providing an updated image of the interaction zone in response to changes in the interaction zone reduces network resource requirements.

While examples disclosed herein are explained in the context of providing a new image of an interaction zone from a host device to a remote device, other approaches for enabling display of the interaction zone at the remote device may additionally or alternatively be used such as, for example, establishing a video stream from the host device to the remote device.

The example interaction capture circuitry 370 may additionally conduct an interaction procedure. An example interaction procedure is described in further detail below in connection with FIG. 7. In short, the interaction procedure involves the capture of an interaction event, and communication of details of the interaction event to the host device 105 to facilitate application of such interaction. In some examples, the interaction procedure may be performed serially with receipt of images for display. However, in some examples, the display of images and the capture of interaction events may be separated and performed in parallel.

In some examples, the cross-device interaction circuitry 335 includes means for capturing. For example, the means for capturing may be implemented by interaction capture circuitry 370. In some examples, the interaction capture circuitry 370 may be instantiated by programmable circuitry such as the example programmable circuitry 1112 of FIG. 11. For instance, the interaction capture circuitry 370 may be instantiated by the example microprocessor 1200 of FIG. 12 executing machine executable instructions such as those implemented by at least blocks 650, 655, 660, and 670 FIG. 6. In some examples, interaction capture circuitry 370 may be instantiated by hardware logic circuitry, which may be implemented by an ASIC, XPU, or the FPGA circuitry 1300 of FIG. 13 configured and/or structured to perform operations corresponding to the machine readable instructions. Additionally or alternatively, the interaction capture circuitry 370 may be instantiated by any other combination of hardware, software, and/or firmware. For example, the interaction capture circuitry 370 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example interaction application circuitry 375 of the illustrated example of FIG. 3 applies interactions received from the interaction capture circuitry 370 of a remote device. In this manner, the example interaction application circuitry 375 enables a user to interact with a host device from a remote device. In examples disclosed herein, there are two primary modes of operation of the example interaction application circuitry 375: controlling an input of the host device, and editing content presented at the host device. In some examples, the modes may be blended. Such modes are not necessarily mutually exclusive in some examples. Rather, in some such examples, both control of an input and editing of content may be enabled.

When functioning in the input controlling mode, the user is enabled to directly make edits across devices. This could occur in many ways. In a first example approach, a remote device (e.g., the original source of the content) is used purely as an input device to create the input on the host device that will create edits within a given application. In other words, the receiving application receives input as though the controlling device were a standard input device for the host device.

Alternatively, when functioning in a content edit mode, the remote device has its own application for making edits, which may provide an improved user experience. In some such examples, the user makes the edits on the remote device, and the interaction application circuitry 375 sends the revised document to the host device or sends a list of edits to the application on the host device. The approach taken depends on the application. For example, some applications track edit(s) in a list that a user can undo individually. In some such examples, the remote device may send just a list of edits. If the content is not editable by using such an approach (e.g., a jpeg image), the remote device might instead send the newly edited content. Of course, backups of version(s) may be retained to facilitate the undoing of such edits.

In some examples, the cross-device interaction circuitry 335 includes means for applying. For example, the means for applying may be implemented by interaction application circuitry 375. In some examples, the interaction application circuitry 375 may be instantiated by programmable circuitry such as the example programmable circuitry 1112 of FIG. 11. In some examples, interaction application circuitry 375 may be instantiated by hardware logic circuitry, which may be implemented by an ASIC, XPU, or the FPGA circuitry 1300 of FIG. 13 configured and/or structured to perform operations corresponding to the machine readable instructions. Additionally or alternatively, the interaction application circuitry 375 may be instantiated by any other combination of hardware, software, and/or firmware. For example, the interaction application circuitry 375 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example application control circuitry 380 of the illustrated example of FIG. 3 receives application-specific interactions at a remote device (e.g., a device controlling another device) and/or applies such application-specific interactions at a host device. For example, the application control circuitry 380 of a second device (e.g., a host device) determines a location at which incoming content is to be placed. The location may be, for example, within a document presently being edited at the second/host device. In some examples, the application control circuitry 380 prompts the user to identify and/or confirm the location at which the incoming content is to be placed (e.g., inserted). In some examples, the location may be a location within an application 350 of the host device. In some examples, the application control circuitry 381 interacts with the edit control circuitry 381 and/or the edit tracker circuitry 382 to apply edits (e.g., updates) to content previously provided by a remote device to a host device.

In some examples, the cross-device interaction circuitry 335 includes means for controlling. For example, the means for controlling may be implemented by application control circuitry 380. In some examples, the application control circuitry 380 may be instantiated by programmable circuitry such as the example programmable circuitry 1112 of FIG. 11. For instance, the application control circuitry 380 may be instantiated by the example microprocessor 1200 of FIG. 12 executing machine executable instructions such as those implemented by at least block 840 of FIG. 8. In some examples, application control circuitry 380 may be instantiated by hardware logic circuitry, which may be implemented by an ASIC, XPU, or the FPGA circuitry 1300 of FIG. 13 configured and/or structured to perform operations corresponding to the machine readable instructions. Additionally or alternatively, the application control circuitry 380 may be instantiated by any other combination of hardware, software, and/or firmware. For example, the application control circuitry 380 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example edit control circuitry 381 of the illustrated example of FIG. 3 tracks the content that is transferred to a first device (e.g., a host device) from a second device (e.g., a remote device). When a user initiates a session of editing with the remote device on a host device, the example edit control circuitry 381 enables the user to select such content. In the case of editing content immediately after transfer, the content lands in the application that has OS focus. However, if the content is not useable in an application that currently has focus (e.g., a different application has been selected on the host device), the edit control circuitry 381 may alternate the focus of the host device to an application where the content is usable and/or is present to enable the edits to be made.

In some examples, the cross-device interaction circuitry 335 includes means for tracking. For example, the means for editing may be implemented by the example edit control circuitry 381. In some examples, the edit control circuitry 381 may be instantiated by programmable circuitry such as the example programmable circuitry 1112 of FIG. 11. In some examples, edit tracker circuitry 382 may be instantiated by hardware logic circuitry, which may be implemented by an ASIC, XPU, or the FPGA circuitry 1300 of FIG. 13 configured and/or structured to perform operations corresponding to the machine readable instructions. Additionally or alternatively, the edit control circuitry 381 may be instantiated by any other combination of hardware, software, and/or firmware. For example, edit control circuitry 381 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example edit tracker circuitry 382 of the illustrated example of FIG. 3 tracks edits respectively done on different pieces of content and the corresponding device(s) that made the edit(s). For example, after a remote device performs an edit of content on a host device, the user may make additional edits on the host device before engaging the remote device for additional edits. In this case, when the user initiates another edit session on the remote device, the example edit tracker circuitry 382 ensures that the user is presented with the latest version of the content from the host device for further editing. In some examples, a version identifier and/or other identifier of the content is exchanged between the edit tracker 382 of the host device and/or the remote device to facilitate a determination of whether a new version of the content to be edited is to be provided. In some examples, the edit tracker circuitry 382 maintains a version history to coordinate between version histories on the two devices.

In some examples, the cross-device interaction circuitry 335 includes means for tracking. For example, the means for tracking may be implemented by the example edit tracker circuitry 382. In some examples, the edit tracker circuitry 382 may be instantiated by programmable circuitry such as the example programmable circuitry 1112 of FIG. 11. In some examples, edit tracker circuitry 382 may be instantiated by hardware logic circuitry, which may be implemented by an ASIC, XPU, or the FPGA circuitry 1300 of FIG. 13 configured and/or structured to perform operations corresponding to the machine readable instructions. Additionally or alternatively, the edit tracker circuitry 382 may be instantiated by any other combination of hardware, software, and/or firmware. For example, the edit tracker circuitry 382 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example sensors 330 of the illustrated example of FIG. 3 include sensors for capturing user interaction. In some examples, the example sensors 330 include one or more cameras, microphone arrays, motion and/or direction sensors (e.g., an accelerometer, a gyroscope, a compass, etc.).

The example communications circuitry 340 of the illustrated example of FIG. 3 includes any circuitry for facilitating communication with other devices. In some examples, the communications circuitry may include a WiFi adapter, an Ethernet adapter, and/or a Bluetooth adapter. In this manner, the example communications circuitry 340 may enable communications with other devices (e.g., between a host device and a remote device) either via a network (e.g., the local network) or via peer-to-peer communications.

The example authentication sub-system 345 of the illustrated example of FIG. 3 enables authentication of a user at the user device. In this manner, the authentication sub-system enables such cross-device content transfer between authenticated users and/or devices. In some examples, once a user is authenticated to a device, (e.g., via face recognition on a phone and/or other remote device), a host device (e.g., a personal computer) will allow authentication automatically based on the proximity of that authenticated remote device if that remote device has been previously setup with a token and/or other trust mechanism. Such an approach avoids wireless transmission of biometric data and/or user credentials. Users could, of course, authenticate to each of their devices individually using biometrics and/or passwords.

The example application(s) 350 of the illustrated example of FIG. 3 include any applications that may make use of exchanged data (e.g., a word processor, an email application, a text messaging application, a telephone application, etc.) and/or any application which may be used for displaying and/or editing content including, for example, an image editor, a text editor, a presentation editor, computer aided design (CAD) software, etc. Moreover, the application(s) 350 may include operating system functionality of the user device to enable a user to switch between applications on a host device from a remote device.

The example display 355 of the illustrated example of FIG. 3 is implemented by any type of circuitry capable of presenting a user interface to a user. In some examples, the display 355 may be implemented by a graphics driver and/or other graphics circuitry (e.g., a graphics processing unit), and may provide display instructions and/or data to an external display (e.g., an external monitor). While in the illustrated example of FIG. 3, a single display 355 is represented, in some examples, multiple displays may be utilized. For example, a desktop computer may have two or more monitors.

Figure 4:
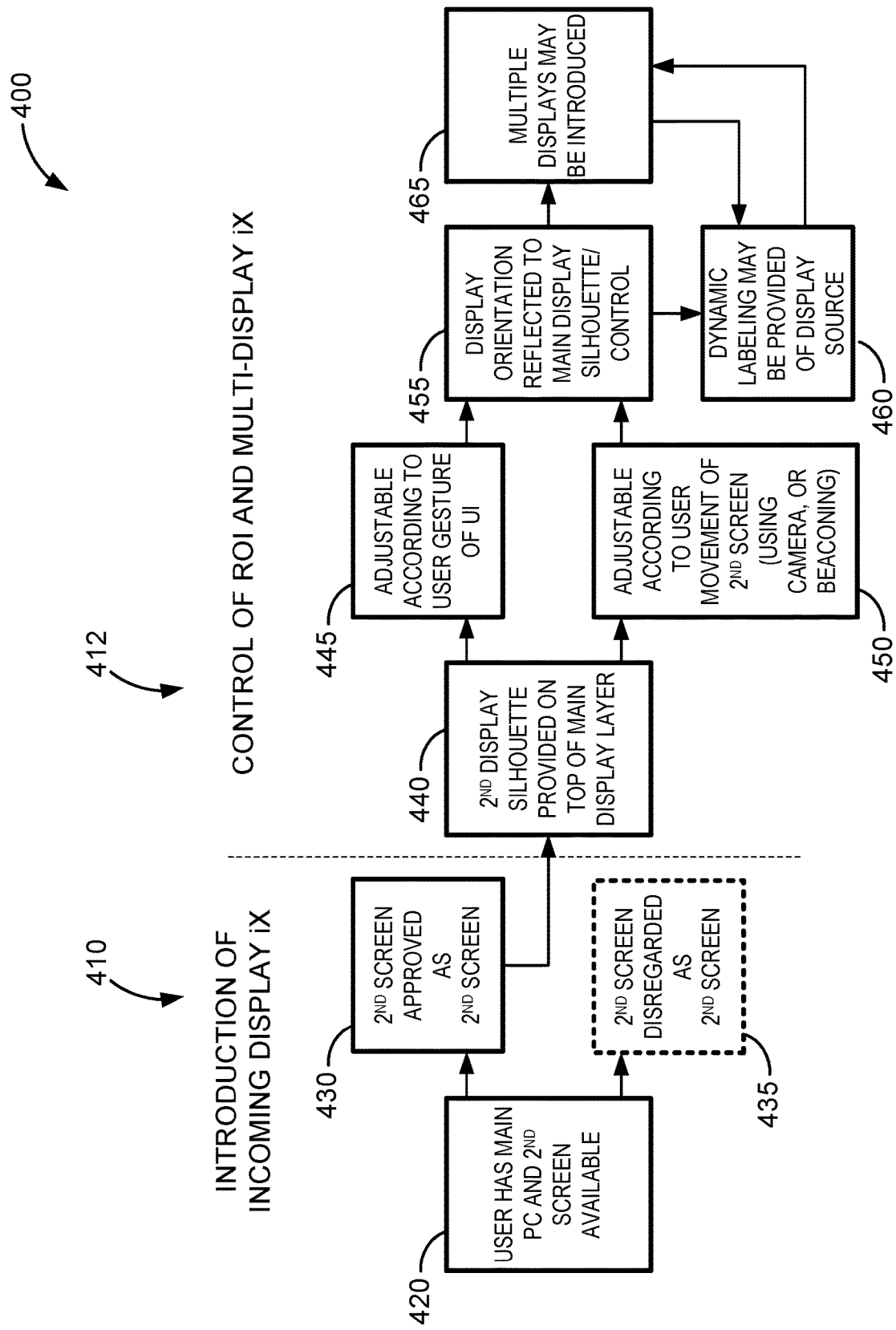
FIG. 4 is a state diagram illustrating an example progression of events to control a region of interest in a multi-display user interface.

FIG. 4 is a state diagram 400 illustrating an example progression of events to control a region of interest in a multi-display user interface. In the illustrated example of FIG. 4, two phases are shown, a first phase 410, in which an incoming display interface is introduced, and a second phase 412 in which control of a region of interest and multi-display interface is established.

The example state diagram 400 begins in the first phase 410 when a user has a main user interface (e.g., a personal computer), and a second device with a second screen available. (Block 420). Authentication is performed to either approve the second device as a second screen (block 430), or not approve the second device as the second screen (block 435). If the second device is approved, a silhouette of an area to be displayed by the second screen is provided on top of the main display. (Block 440). Such a silhouette is adjustable according to user gesture (e.g., moving the silhouette by dragging and dropping, resizing, etc.) (block 445) or by moving the second device and using a camera to capture the main display. (Block 450).

The display orientation of the second device is then oriented to reflect the main display silhouette. (Block 455). Subsequently, dynamic labeling (e.g., labeling that may be dependent upon the device(s) associated with the silhouette) may be provided to provide clarity of the display source. (Block 460). Moreover, multiple additional displays may be introduced following a similar procedure. (Block 465).

Figure 5:
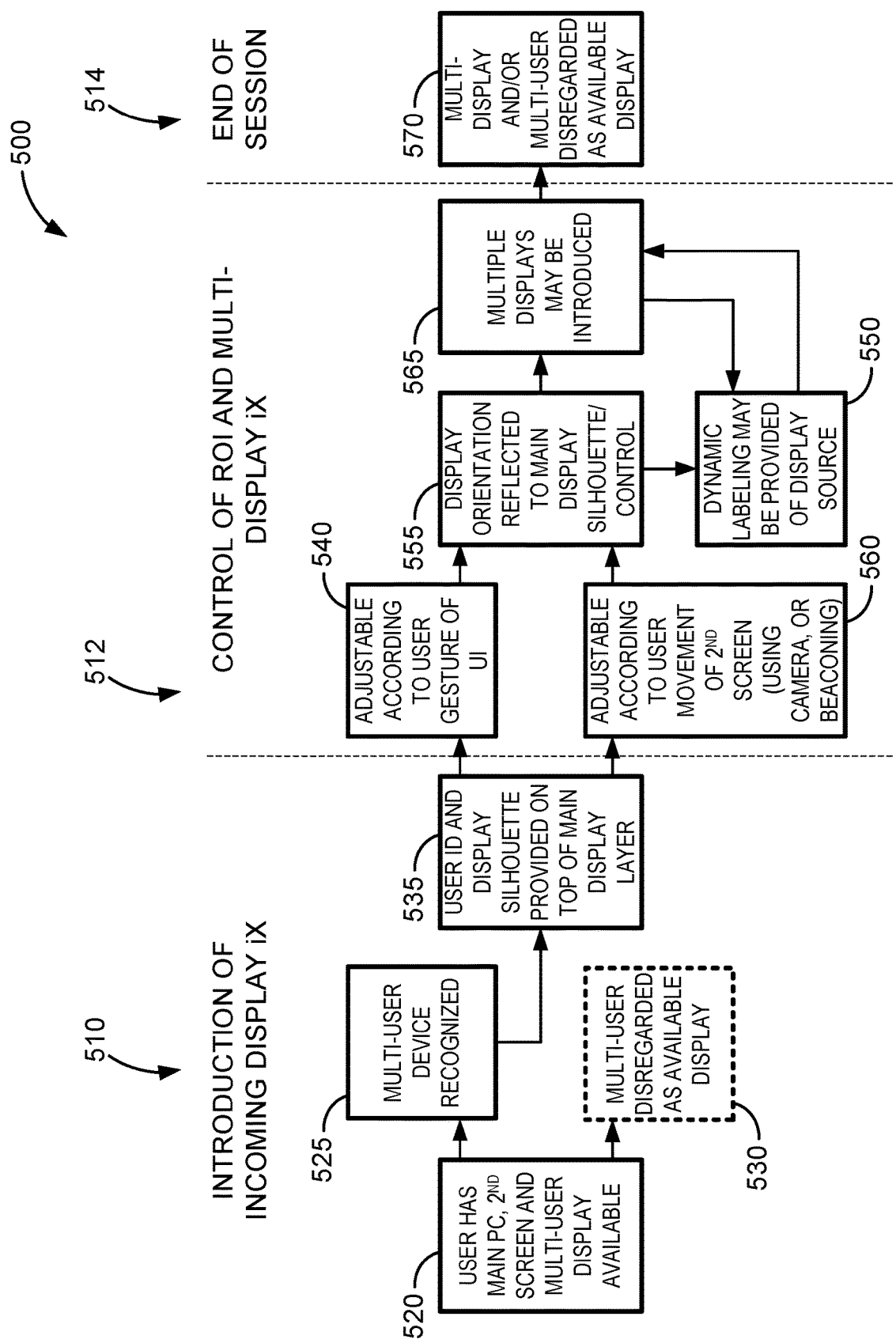
FIG. 5 is an alternative state diagram illustrating an example progression of events to control a region of interest in a multi-display user interface.

FIG. 5 is an alternative state diagram illustrating an example progression of events to control a region of interest in a multi-display user interface. In the illustrated example of FIG. 5, three phases are shown, a first phase 510, in which an incoming display interface is introduced; a second phase 512 in which control of a region of interest and multi-display interface is established; and a third phase 514, in which the multi-display and/or multi-user session is ended.

The example state diagram 500 begins in the first phase 510 when a user has a main user interface (e.g., a personal computer), a second device with a second screen, and a multi-user display available. (Block 520). Authentication is performed to either approve the multi-user device as an available display (block 525), or not approve the multi-user device as an available display (block 530). If the multi-user device is approved, a silhouette of an area to be displayed by the multi-user device is provided on top of the main display with a corresponding identifier (e.g., a user ID, a display ID, etc.). (Block 535). Such a silhouette is adjustable based on user gesture(s) (e.g., interactions with a touch screen to move the silhouette by dragging and dropping, resizing, etc.) (block 540) or by moving the first and/or the second device and using a camera to capture the main display. (Block 550).

The display orientation of the image presented at the second device is then oriented to reflect the main display silhouette. (Block 555). Subsequently, dynamic labeling may be provided to provide clarity of the display source. (Block 560). Moreover, multiple additional displays may be introduced following a similar procedure. (Block 565). At the end of a session, the multi-display and/or multi-user devices may be disregarded. (Block 570).

While an example manner of implementing the cross-device interaction circuitry 335 of FIG. 1 is illustrated in FIG. 3, one or more of the elements, processes, and/or devices illustrated in FIG. 3 may be combined, divided, re-arranged, omitted, eliminated, and/or implemented in any other way. Further, the example sensor data collection circuitry 360, the example framing circuitry 365, the example selection circuitry 367, the example interaction capture circuitry 370, the example interaction application circuitry 375, the example application control circuitry 380, the example edit control circuitry 381, the example edit tracker circuitry 382, and/or, more generally, the example cross-device interaction circuitry 335 of FIG. 3, may be implemented by hardware alone or by hardware in combination with software and/or firmware. Thus, for example, any of the example sensor data collection circuitry 360, the example framing circuitry 365, the example selection circuitry 367, the example interaction capture circuitry 370, the example interaction application circuitry 375, the example application control circuitry 380, the example edit control circuitry 381, the example edit tracker circuitry 382, and/or, more generally, the example cross-device interaction circuitry 335, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example cross-device interaction circuitry 335 of FIG. 3 may include one or more elements, processes, and/or devices in addition to, or instead of, those illustrated in FIG. 3, and/or may include more than one of any or all of the illustrated elements, processes and devices.

Figure 6:
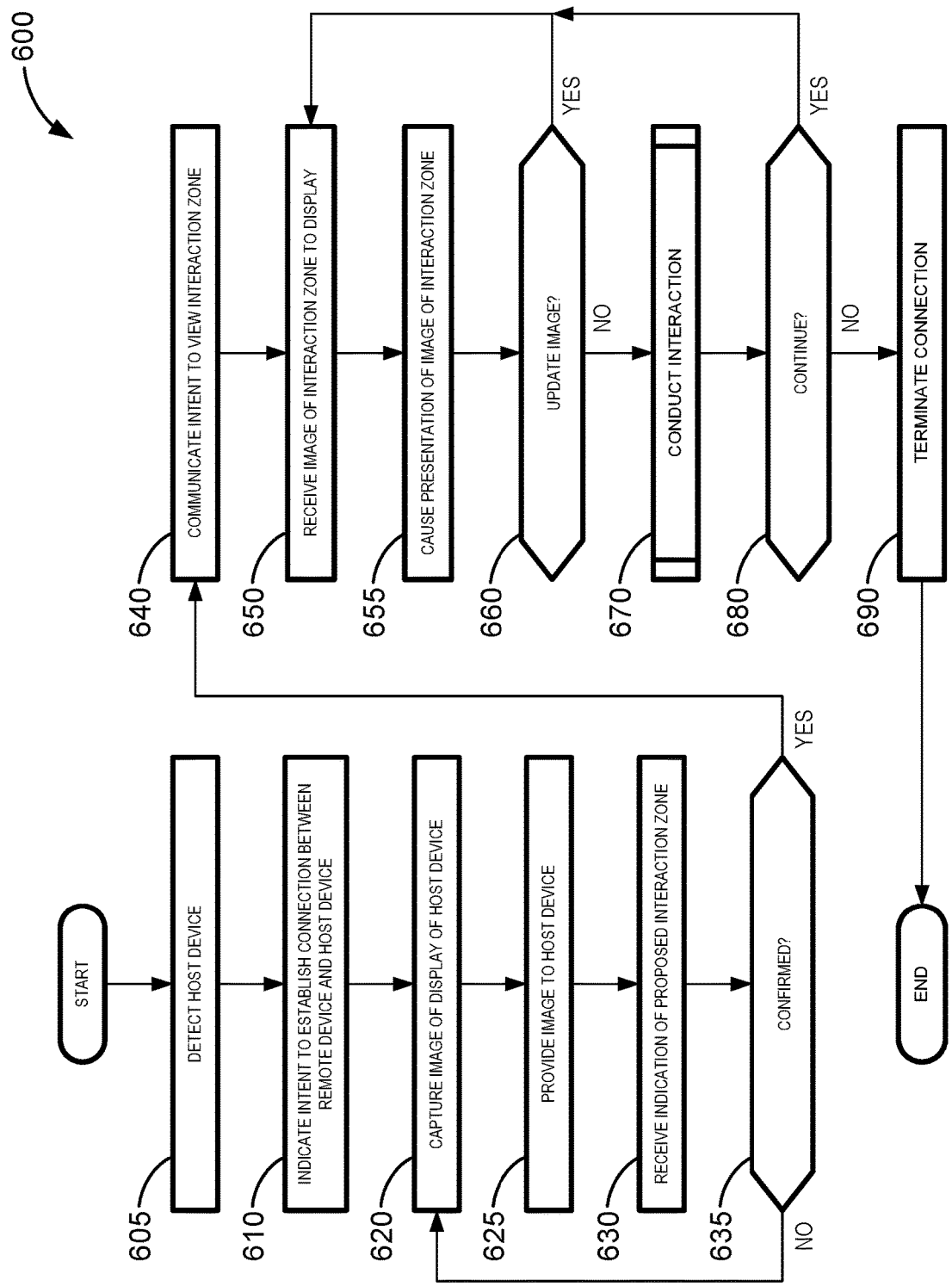
FIG. 6 is a flowchart representative of example machine readable instructions and/or example operations that may be executed, instantiated, and/or performed by programmable circuitry to establish a region of interest of a host device for display on a remote device and facilitate interactions between the same.
Figure 7:
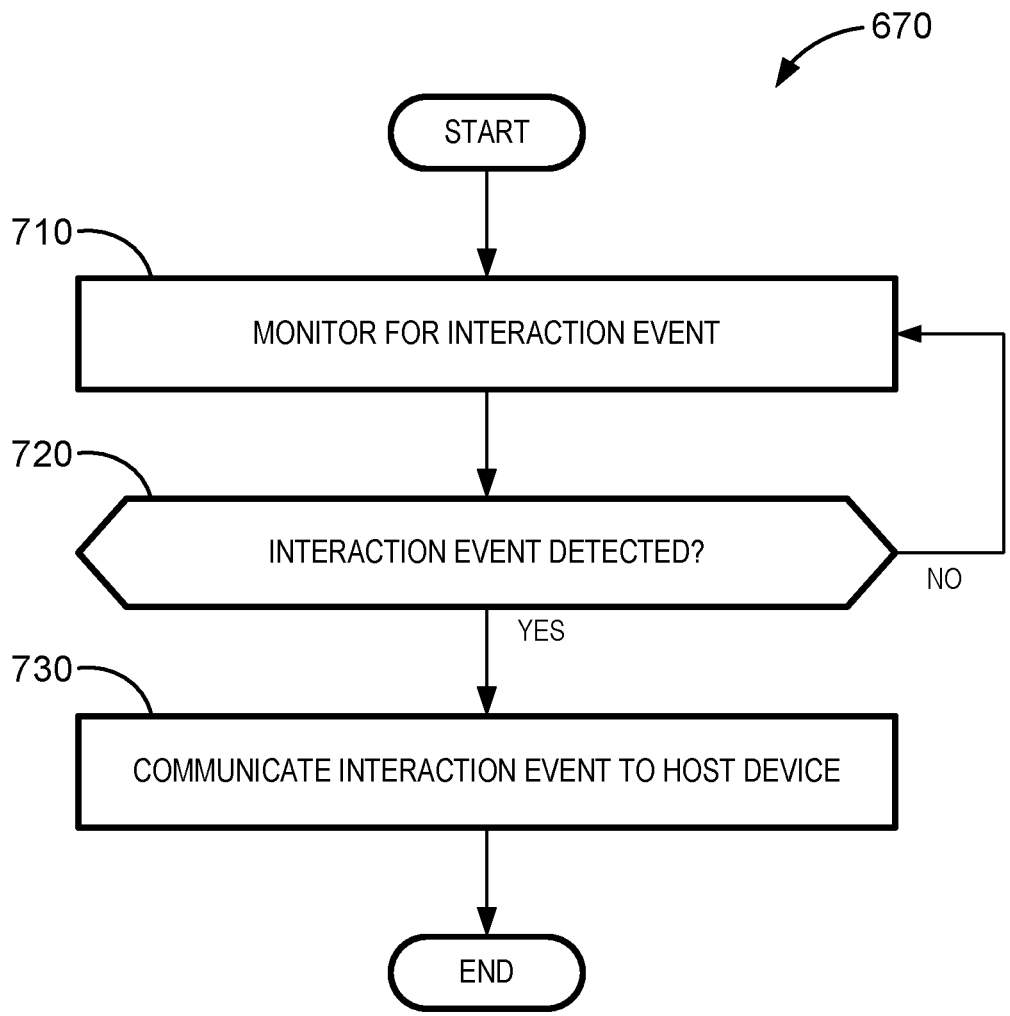
FIG. 7 is a flowchart representative of example machine readable instructions and/or example operations that may be executed, instantiated, and/or performed by programmable circuitry to provide details of an interaction event to a host device.

Flowchart(s) representative of example machine readable instructions, which may be executed by programmable circuitry to implement and/or instantiate the cross-device interaction circuitry 335 of FIG. 3 and/or representative of example operations which may be performed by programmable circuitry to implement and/or instantiate the cross-device interaction circuitry 335 of FIG. 3, are shown in FIGS. 6, 7, and/or 8. The machine readable instructions may be one or more executable programs or portion(s) of one or more executable programs for execution by programmable circuitry such as the programmable circuitry 1112 shown in the example processor platform 1100 discussed below in connection with FIG. 11 and/or may be one or more function(s) or portion(s) of functions to be performed by the example programmable circuitry (e.g., an FPGA) discussed below in connection with FIGS. 12 and/or 13. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6, 7, and/or 8, many other methods of implementing the example cross-device interaction circuitry 335 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6, 7, and/or 8 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

FIG. 6 is a flowchart representative of example machine readable instructions and/or example operations 600 that may be executed, instantiated, and/or performed by programmable circuitry to establish a region of interest of a host device for display on a remote device and facilitate interactions between the same. The example machine-readable instructions and/or the example operations 600 of FIG. 6 begin at block 605, at which the cross-device interaction circuitry 335 of the remote device 110 detects a host device 105. The example cross-device interaction circuitry 335 may detect the host device 105 via a network, such as the local network 310. In some examples, the detection may be performed via a local connection (e.g., a peer-to-peer connection) between the remote device 110 and the host device 105. In some other examples, the detection may be performed by interacting with the connection agent circuitry 320 hosted at a cloud service 315.

Upon detection of the host device 105, the cross-device interaction circuitry 335 of the remote device 105 indicates an intent to establish a connection between the remote device and the host device. (Block 610). The indication of the intent may be communicated via the local network 310 to the host device, or via any other communication channel.

At this point, the user of the remote device may be presented with a dialog instructing the user to orient the sensor(s) of the remote device for capture of an image of the display of the host device. The example sensor data collection circuitry 360 communicates with the sensor(s) 330 (e.g., a camera) to capture an image. (Block 620). The capturing of the image may, in some examples, be in response to a user indicating that the display of the host device is framed by the sensor appropriately. For example, as illustrated in FIG. 1B, the sensor(s) of the remote device 110 are oriented to capture at least a portion 115 of the display of the host device 105. In some examples, the capturing of the image may be in response to expiration of a timer.

The example framing circuitry 365 of the remote device 110 provides the captured image to the host device 105. (Block 625). The example selection circuitry 367 of the host device 105 analyzes the captured image in association with information being displayed via the display 355 of the host device 105, and applications displayed on the display 355, to identify a proposed interaction zone/region of interest, and reply to the remote device 110 with an indication of the proposed interaction zone/region of interest. (Block 630). In some examples, the proposed interaction zone represents a portion of the display without respect to locations of applications displayed. In some examples, the selection circuitry 367 may perform a snap-to-application to select the proposed interaction zone 118. For example, as illustrated in FIG. 1C, an indication (e.g., an outline) of the proposed interaction zone 118 may be displayed on the display of the host device 105, while the remote device 110 presents a prompt to the user requesting confirmation of the proposed interaction zone. (Block 635).

If the user indicates that they do not wish to proceed with the proposed interaction zone (e.g., block 635 returns a result of NO), the example process returns to block 620, where a subsequent image is captured.

If the user confirms the interaction zone (e.g., block 635 returns a result of YES), the interaction capture circuitry 370 of the remote device 110 communicates an intent to view the interaction zone to the host device 105. Using the interaction zone, the interaction capture circuitry 370 of the host device 105 provides an image of the interaction zone to be displayed to the remote device 110. The example interaction capture circuitry 370 of the remote device 110 receives the image of the interaction zone from the host device 105. (Block 650). The example interaction capture circuitry causes the display 355 to present the received image of the interaction zone. (Block 655).

The example interaction capture circuitry 370 determines whether to update the image of the interaction zone. (Block 660). The determination of whether to update the interaction zone may be based on, for example, whether a new image of the interaction zone has been received. For example, the host device 105 may periodically provide an updated image of the interaction zone. In some examples, the interaction zone might be relatively static (e.g., unchanged over time), in which case, the image of the interaction zone might be provided by the host device in response to a detected change in the interaction zone. Providing an updated image of the interaction zone only in response to changes in the interaction zone reduces network resource requirements. If the interaction capture circuitry 370 determines that the image is to be updated (e.g., block 660 returns a result of YES), control proceeds to block 650 where the image is received and subsequently displayed.

In some examples, while waiting for a new image of the interaction zone to be received, the cross-device interaction circuitry 335 may determine if a user is attempting to interact with the interaction zone. As such, if the interaction capture circuitry 370 determines that the image is not to be updated (e.g., block 660 returns a result of NO), the example interaction capture circuitry 370 conducts an interaction procedure. (Block 670). The interaction procedure is described in further detail below in connection with FIG. 7. In short, the interaction procedure involves the capture of an interaction event, and communication of details of the interaction event to the host device 105 to facilitate application of such interaction.

The example interaction capture circuitry 370 then determines whether to continue. (Block 680). In some examples, the interaction may include an indication by the user that they no longer wish to continue the remote session. Barring such an indication of intent to end the session (e.g., block 680 returning a result of YES), control returns to block 650, where a subsequent image of the interaction zone is received and displayed. If the example interaction capture circuitry 370 detects an intent to end the session (e.g., block 680 returns a result of NO), the interaction capture circuitry 370 causes the communications circuitry 340 to communicate an intent to end the session to the host device 105. (Block 690). The example process of FIG. 6 then terminates, but may be repeated in response to an indication from a user regarding an intent to establish a subsequent remote interaction session.

FIG. 7 is a flowchart representative of example machine readable instructions and/or example operations 670 that may be executed, instantiated, and/or performed by programmable circuitry to provide details of an interaction event to a host device. The example machine-readable instructions and/or the example operations 670 of FIG. 7 begin at block 710, at which the interaction capture circuitry 370 of the remote device 110 monitors for an interaction event. In examples disclosed herein, the interaction event may originate from any type of interaction with the remote device 110. For example, such interaction event may represent a user touching a touchscreen, a mouse click, a keystroke, movement of the remote device 110, etc. Moreover, the interaction event may represent particular types of interactions within a presented interaction zone. For example, the interaction event may represent a click within the interaction zone.

The example interaction capture circuitry 370 determines whether an interaction event has been detected. (Block 720).

If no interaction event has been detected (e.g., block 720 returns a result of NO), the example interaction capture circuitry 370 continues to monitor for an interaction event. (Blocks 710, 720). In some examples, if no interaction event is detected after a threshold amount of time, the example process of FIG. 7 may be terminated and control may return to FIG. 6 to enable subsequent images to be received.

If an interaction event is detected (e.g., block 720 returns a result of YES), the example interaction capture circuitry 370 identifies details of the interaction event, and communicates those details to the host device via the communications circuitry 340. (Block 730).

In some examples, the details may include a type of the event (e.g., a mouse click event, a mouse down event, a mouse up event, a key down event, a key up event, a touch event, etc.), details concerning a location of the event (e.g., a location within the interaction zone, an identifier of the interacted element on the host display, etc.), and/or other information needed for the host device to replicate the interaction. In some examples, path information is included in the details. Such path information may represent points at which a user conducted an interaction (e.g., a path from where the user began a touch event to where the user ended the touch event). In some examples, an intensity value is included, which represents the intensity of the interaction (e.g., was a stylus and/or finger pressed firmly or lightly against a touchscreen).

Using the details of the interaction event, the interaction application circuitry 375 of the host device 105 applies the interaction. Such interaction will then be reflected in a subsequent image captured by the host device 105 and relayed to the remote device 110 for display. In some examples, to apply the interaction event, the interaction event application circuitry 375 transforms the location(s) of the interaction event for application on the display of the host device 105. The example process 670 of FIG. 7 then terminates, but may be repeated to monitor for subsequent interaction events.

Figure 8:
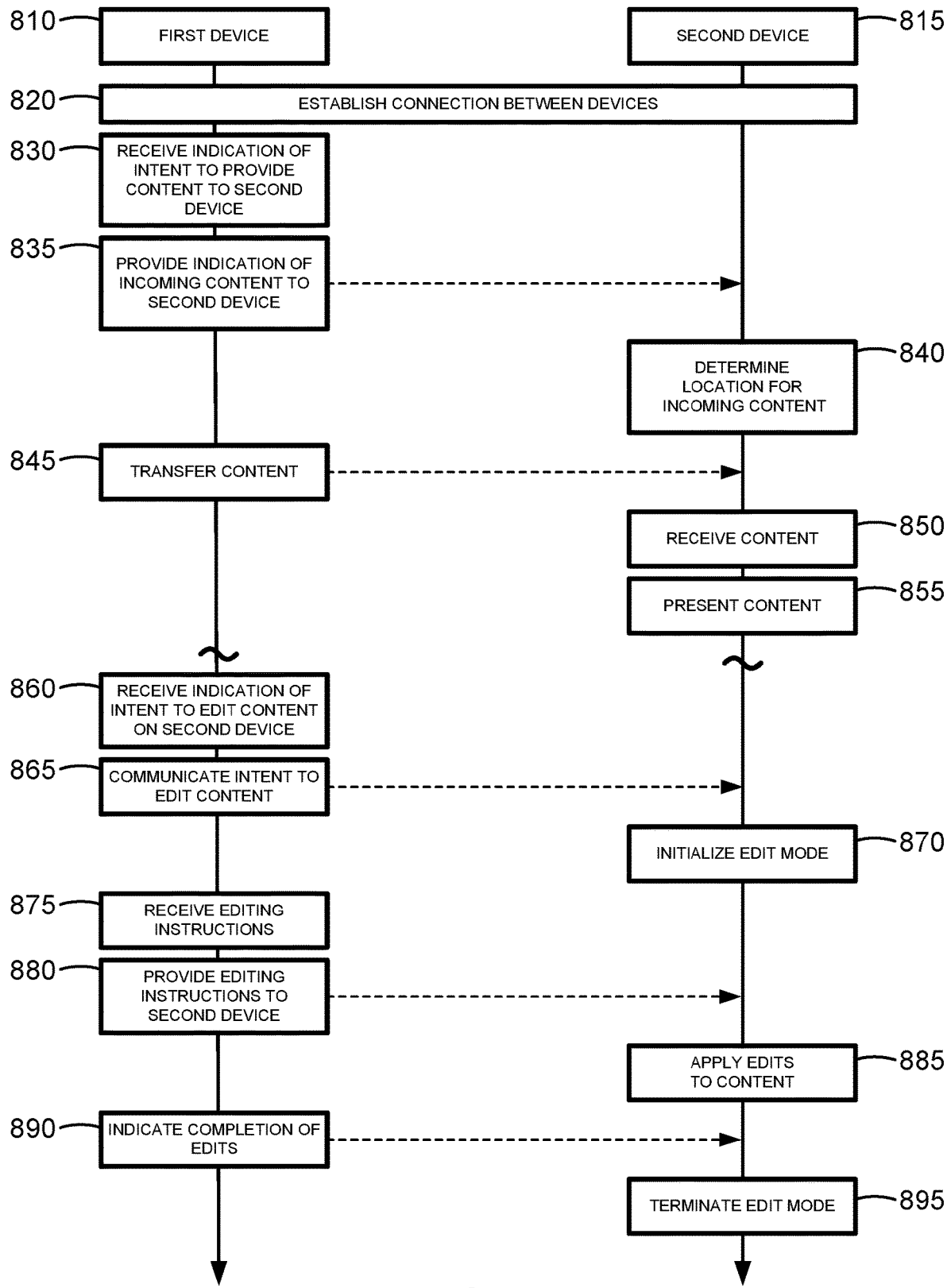
FIG. 8 is a flowchart representative of example machine readable instructions and/or example operations that may be executed, instantiated, and/or performed by programmable circuitry to enable content to be shared and subsequently edited from a first device to a second device.

FIG. 8 is a flowchart representative of example machine readable instructions and/or example operations that may be executed, instantiated, and/or performed by programmable circuitry to enable content to be shared and subsequently edited from a first device 810 to a second device 815. In the illustrated example of FIG. 8, both the first device 810 and the second device 815 may be implemented, separately, the user device 302 of FIG. 3. That is, the first device 810 may be implemented by the user device 302 of FIG. 3, and the second device 815 may be implemented by a separate instance of the user device 302 of FIG. 3.

The example machine-readable instructions and/or the example operations of FIG. 8 begin at block 820, where the first device 810 and the second device 815 establish a connection. (Block 820). The connection may be established based on, for example, a proximity of the devices, a same user being logged into both devices, a connection between the connection agent circuitry 320, etc. In some examples, the establishing of the connection may be performed using the communications circuitry 340 and/or the authentication sub-system 345.

The interaction capture circuitry 370 of the first device 810 receives an indication of intent to provide content to the second device 815. (Block 830). In the illustrated example of FIG. 8, the content to be provided to the second device may include any type of content including, for example, an image, text, a file, a 3D model, an instruction (e.g., executable code), etc. In some examples, a GL transmission format (glTF) may be used as a file structure to for usages such as using the sensors (e.g., gyroscope, accelerometer, etc.) to rotate, enlarge or shrink, and otherwise transform a 3d object. Another example could be using a touch or tap gesture on the display of the remote device to change the texture of a 3d object. These usages allow the user to visualize different orientations, color, etc. of an object as part of the transfer and initial editing process. The example interaction capture circuitry 370, via the communications circuitry 340, communicates an indication of incoming content to the second device. (Block 835).

Based on the indication of incoming content, the example application control circuitry 380 of the second device 815 determines a location at which the incoming content is to be placed. (Block 840). The location may be, for example, within a document presently being edited at the second device 815. In some examples, the application control circuitry 380 prompts the user to identify and/or confirm the location at which the incoming content is to be placed (e.g., inserted). In some examples, the location may be a location within an application 350 of the second device 815.

The example interaction capture circuitry 370 of the first device 810 then provides the selected content to the second device 815. (Block 845). The example application control circuitry 380 of the second device 815 receives the content. (Block 850). The example application control circuitry 380 of the second device 815 then causes the content to be presented. (Block 855). To present the content, the content may be inserted into the application 350. For example, an image (e.g., the inserted content) may be inserted into a text editor application. In this manner, remote copy/paste functionality is achieved.

In addition to copy/paste functionality, examples disclosed herein enable content to later be edited. In some examples, the edit tracker circuitry 382 of the second device 815 saves an identifier of the pasted content, which may then be shared back to the edit tracker circuitry 382 of the first device 810 and used when subsequently editing the content. At some later time, the example interaction capture circuitry 370 of the first device 810 may receive an indication of intent to edit content previously provided to the second device 815. (Block 860). The example interaction capture circuitry 370 then communicates an intent to edit the previously provided content to the second device 815. In some examples, an identifier of the previously provided content is provided to enable the edit tracker circuitry 382 of the second device 815 to appropriately apply any edits to be made.

In response to the indication of the intent to edit the previously provided content, the interaction application circuitry 375 initializes an edit mode. (Block 870). Within the edit mode, interactions with the content are isolated to those interactions from the first device. Such an approach facilitates a simpler user experience, as multiple devices are not editing the same content simultaneously. The interaction capture circuitry 370 receives the editing instructions via the sensor(s) 330 of the first device 810. Such editing instructions are illustrated below in connection with FIGS. 10A, 10B, 10C, 10D, and/or 10E, and may include, for example, editing a location, a rotation, a tilt, a size, etc. of content previously provided to the second device. Moreover, in addition to location and/or sizing of the edited content, the editing instruction may result in an edit to the content itself. For example, an image may be edited, text may be edited, etc.

The example interaction capture circuitry 370, via the communications circuitry 340, communicates the editing instruction(s) to the second device. (Block 875). The interaction application circuitry 375 receives and applies the edits to the previously provided content. (Block 885). The example process of blocks 875, 880, and 885 may be repeated until the edits are completed. The interaction capture circuitry 370 of the first device 810 then receives an indication of the completion of the edits. (Block 890). The completion of the edits may then be communicated to the second device 815. In response to the indication of the completion of editing, the example second device 815 terminates the edit mode. (Block 895). Terminating the edit mode ensures that future changes are not inadvertently applied when not intended.

The example process of blocks 860-895 may then be repeated to apply subsequent edits to the previously shared content. While in the illustrated example of FIG. 8, an edit mode is used to control when edits can be made to previously provided content, in some examples, the edit mode may be omitted. In such an example, blocks 875, 880, and 885 may simply be used to apply an edit to previously provided content.

While in the illustrated example of FIG. 8 two devices are illustrated, in some examples, multiple remote devices may be used to edit the same previously provided content. In some other examples, only the device (or user) that initially provided the content may apply subsequent edits. In some such examples, if the previously provided content is edited outside of the relationship between the first device and the second device (e.g., the content is edited locally at the second device 815), future edits to the previously provided content may be restricted and/or limited.

In some examples, a menu may be presented after a paste from a remote device to a host device. This menu may be on the remote device, the host device, or both. The menu could include many options such as what edit to make or how to set the relationship between device and content. Menus would vary widely across applications and UI approaches.

In some examples, the connection/relationship between the previously provided content and the originating device may be established for a limited time. In other words, the relationship may automatically end with an event such as the phone going to standby or a different app being used. Alternatively, depending on the use case, the connection may persist. With a persistent connection, a user may edit the media on the remote device or the host device, and the media will then be available to "update to match source" or remain as when the content was first provided.

In some examples, image updates may be cascaded across multiple devices. Furthermore, examples disclosed herein improve upon such a multi-device collaboration experience (e.g., one user using multiple devices or multiple users using their respective devices). For example, the user makes an edit of the original content on a remote device, and the system cascades that change to the content in the app on the host device. For example, some users may prefer to edit photos on a phone, instead of on a personal computer. Of course, such cascading of edits should only be done if the user indicates a desire for such cascading.

In some examples, content may be pasted from a first device to a second device, but different displays, applications or portions of the application may offer controls for versioning and uniquely editing the content. For example, if a user drags an image of a family trip to the PowerPoint slide for their biography, the user can then also drag and paste to another slide in backup of the document or into a separate application document (Word, Photo Editor, Social Media). As these medias are linked to the same source (e.g., a remote device), the user has the option to edit the image on the remote device or on the host device, across any of these applications, and then either Apply All Changes to the source file on the remote device, or, customize which changes will land in each of the instances of the content across the various devices. This version history may be stored with the first device and/or the second device as branched media or separate media onto the device.

In some examples, the system may save both original and edited versions of the content on the first device, the second device, in a cloud-based storage, and/or in any other storage.

Figure 9:
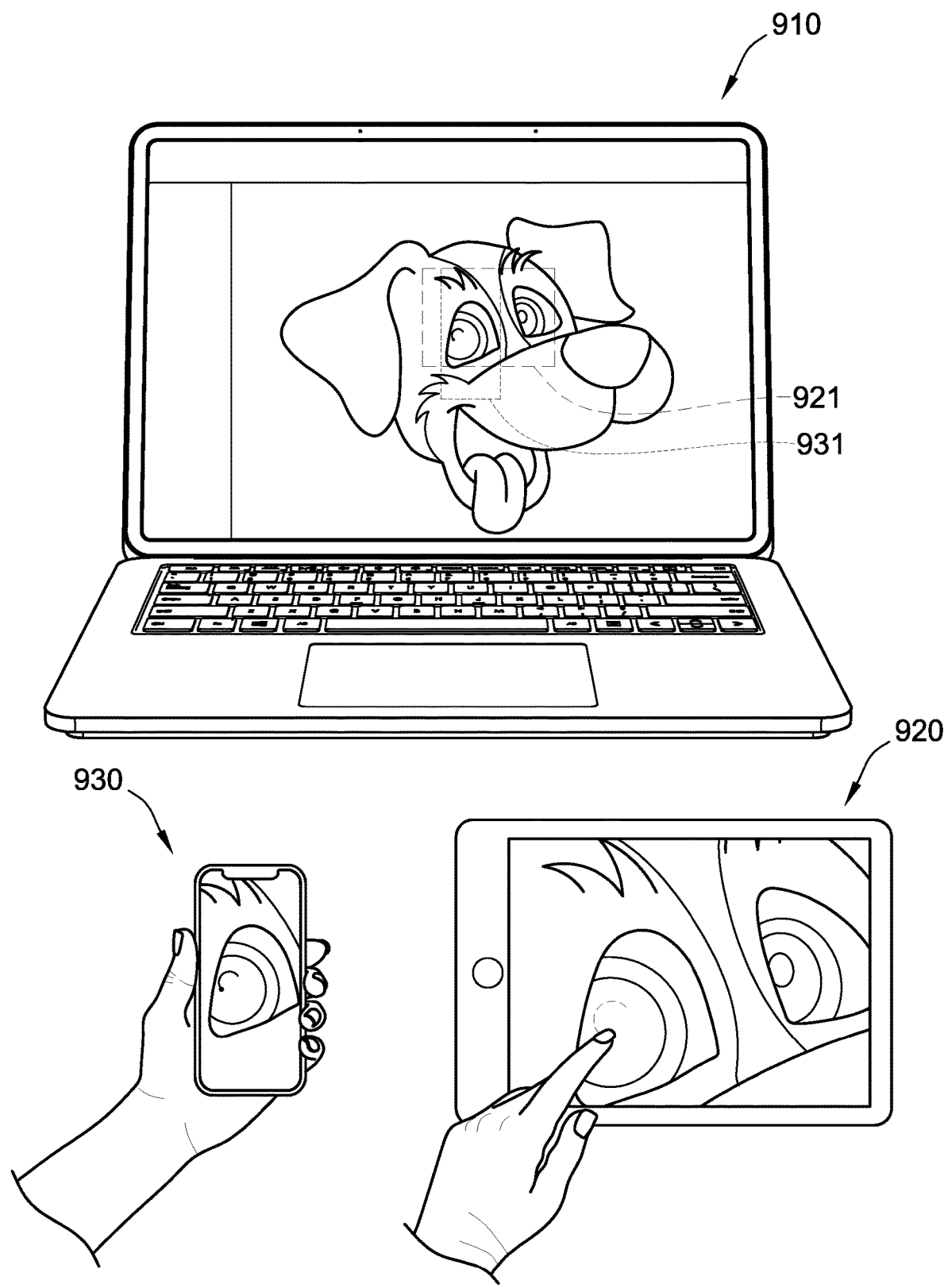
FIG. 9 illustrates an example use case in which multiple remote devices are used to view and/or edit a host device.

FIG. 9 illustrates an example use case in which multiple remote devices are used to view and/or edit a host device. In the illustrated example of FIG. 9, the host device 910 maintains multiple regions of interest in association with respective remote devices 920, 930. A first region of interest 921 is used in association with the first remote device 920, while a second region of interest 931 is used in association with the second remote device 930. In the illustrated example of FIG. 9, an edit is applied via the first remote device 920, and is subsequently displayed via the second remote device 930.

FIGS. 10A, 10B, 10C, 10D, and 10E are illustrations representing edits to content from a remote device being applied at a host device. In the illustrated example 1005 of FIG. 10A, content (e.g., the letter "A") is shared from a remote device (e.g., a smartphone) to a host device (e.g., a laptop). As the remote device is interacted with (e.g., rotated left/right), the edit to the content is applied at the host device. In the illustrated example of FIG. 10A, the letter A is rotated towards the left.

Figure 10A:
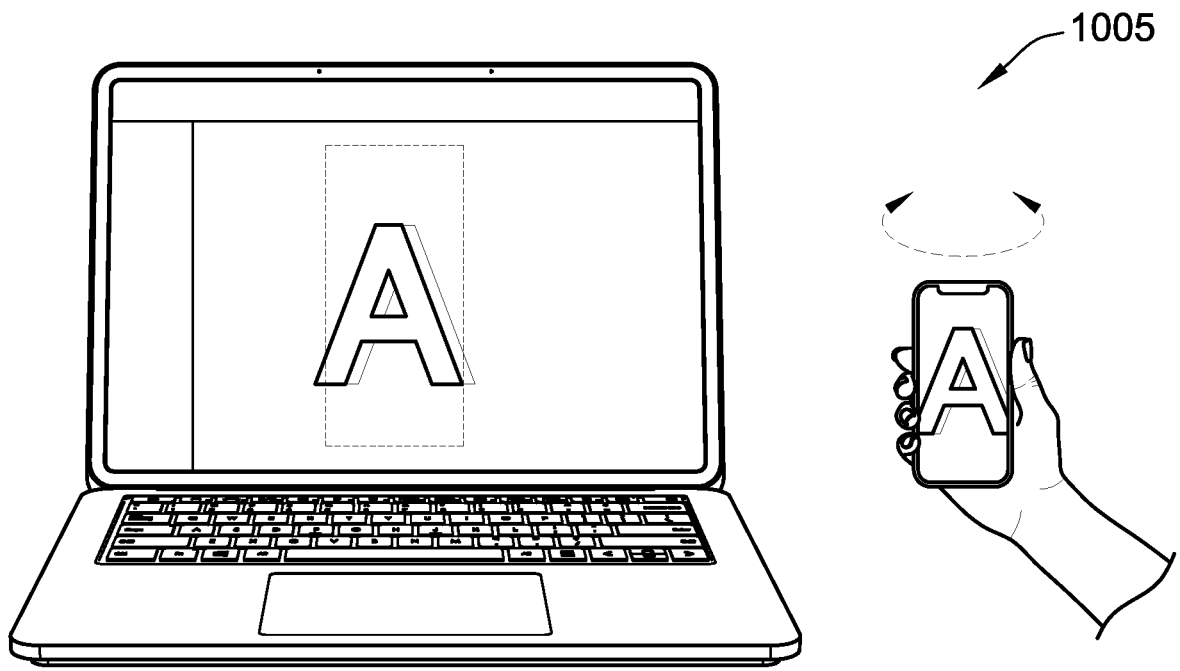
FIGS. 10A, 10B, 10C, 10D, and 10E are illustrations representing edits to content from a remote device being applied at a host device.
Figure 10B:
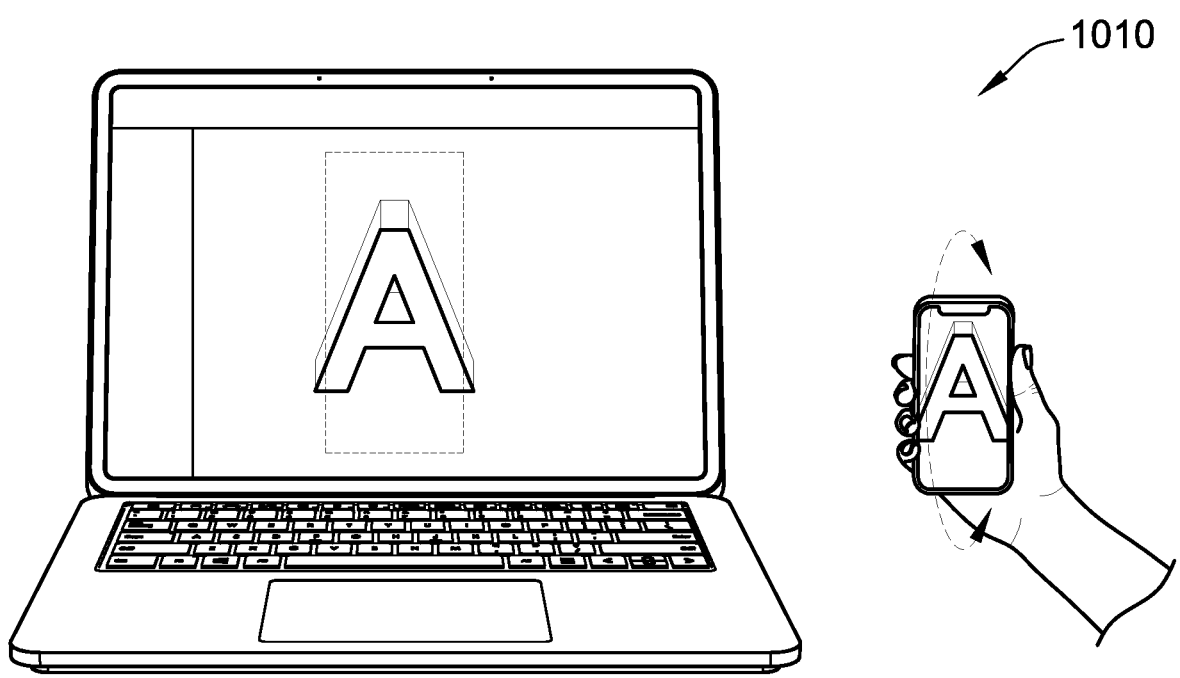

In the illustrated example 1010 of FIG. 10B, content (e.g., the letter "A") is shared from a remote device (e.g., a smartphone) to a host device (e.g., a laptop). As the remote device is interacted with (e.g., rotated upwards/downwards), the edit to the content is applied at the host device. In the illustrated example of FIG. 10B, the letter A is rotated towards the downwards in response to the user rotating the remote device.

Figure 10C:
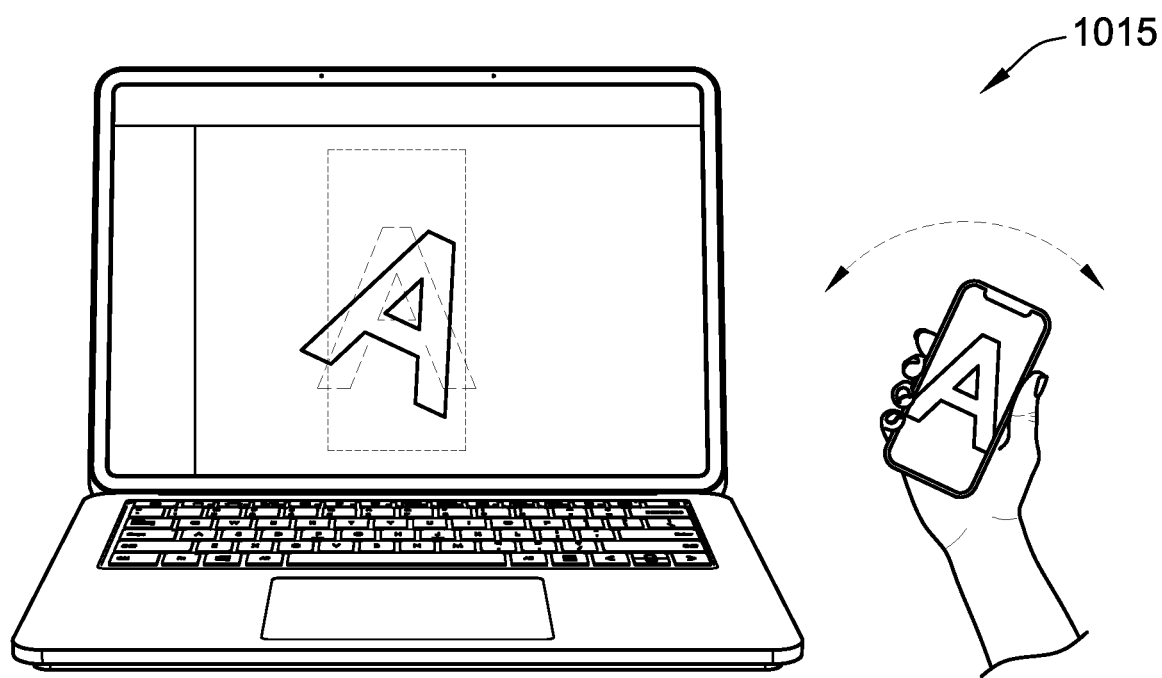

In the illustrated example 1015 of FIG. 10C, content (e.g., the letter "A") is shared from a remote device (e.g., a smartphone) to a host device (e.g., a laptop). As the remote device is interacted with (e.g., tilted), the edit to the content is applied at the host device. In the illustrated example of FIG. 10C, the letter A is tilted towards the right.

Figure 10D:
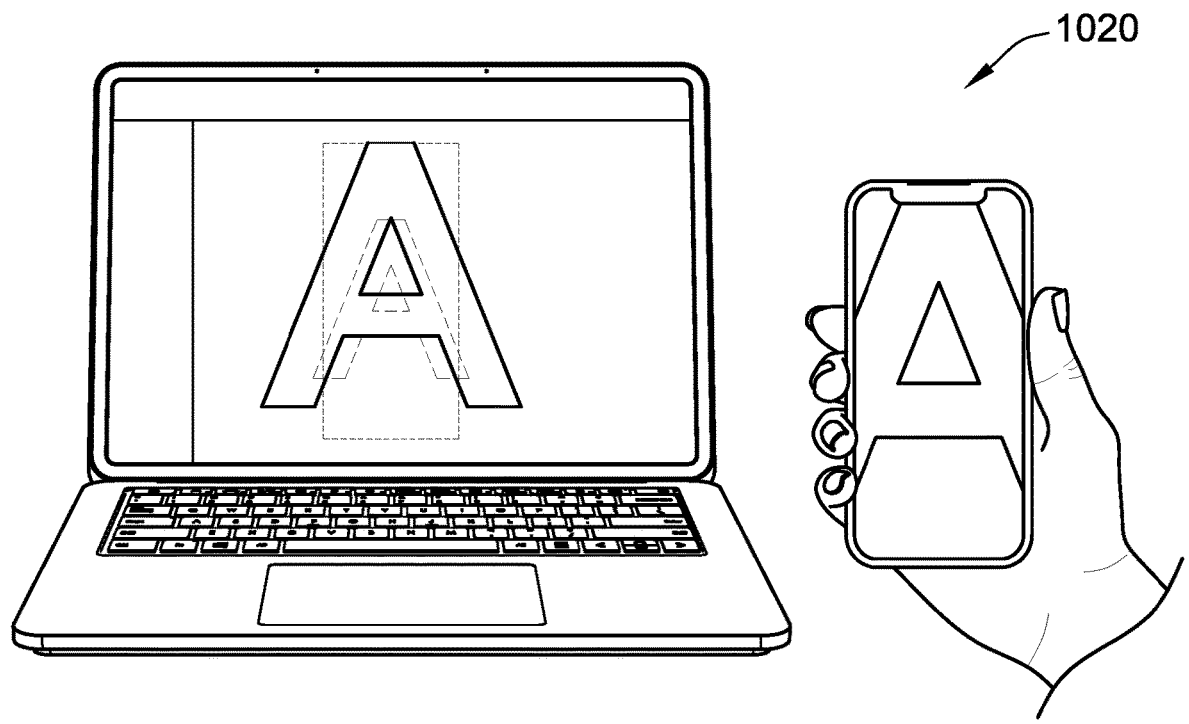

In the illustrated example 1020 of FIG. 10D, content (e.g., the letter "A") is shared from a remote device (e.g., a smartphone) to a host device (e.g., a laptop). As the remote device is interacted with (e.g., moved closer to the user and/or further from the host device), the edit to the content is applied at the host device. In the illustrated example of FIG. 10D, the letter A is enlarged as the user moves the remote device further from the host device.

Figure 10E:
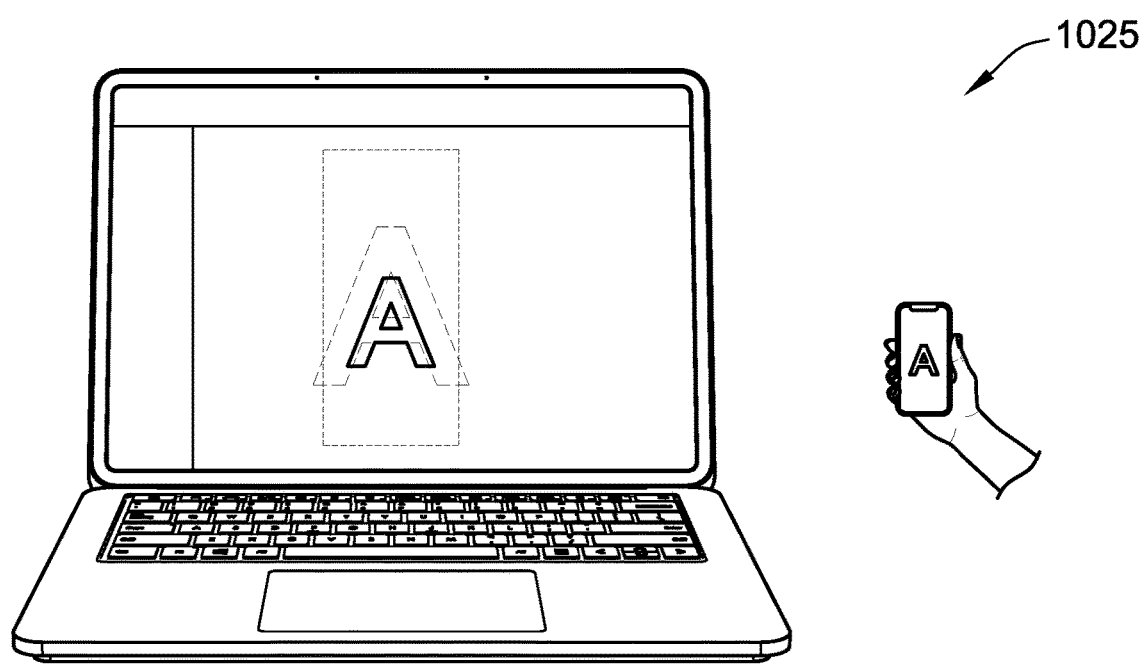

In the illustrated example 1025 of FIG. 10E, content (e.g., the letter "A") is shared from a remote device (e.g., a smartphone) to a host device (e.g., a laptop). As the remote device is interacted with (e.g., moved closer to the user and/or further from the host device), the edit to the content is applied at the host device. In the illustrated example of FIG. 10D, the letter A is enlarged as the user moves the remote device further from the host device.

Throughout the illustrated examples of FIGS. 10A, 10B, 10C, 10D, and/or 10E, various positional/locational edits are made to existing content. However, any other types of edits may additionally or alternatively be made to the content. For example, the content itself may be edited (e.g., the letter A may be replaced with a different letter). Moreover, multiple edits to the content may be made simultaneously. For example, the content may be enlarged, rotated, and tilted all at the same time.

Figure 11:
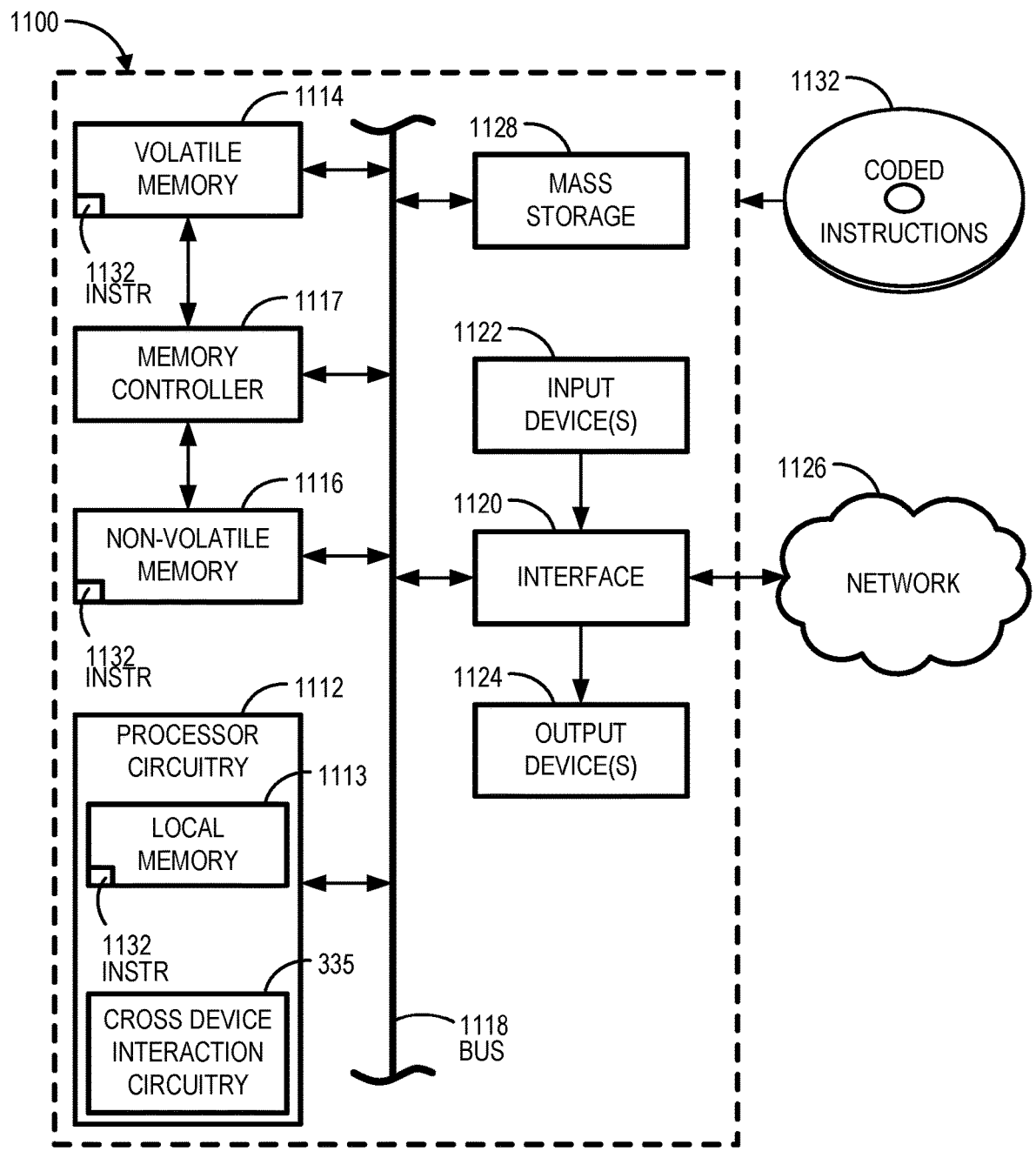
FIG. 11 is a block diagram of an example processing platform including programmable circuitry structured to execute, instantiate, and/or perform the example machine readable instructions and/or perform the example operations of FIGS. 6, 7, and/or 8 to implement the cross-device interaction circuitry of FIG. 3.

FIG. 11 is a block diagram of an example programmable circuitry platform 1100 structured to execute and/or instantiate the example machine-readable instructions and/or the example operations of FIGS. 6, 7, and/or 8 to implement the cross-device interaction circuitry 335 of FIG. 3. The programmable circuitry platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1100 of the illustrated example includes programmable circuitry 1112. The programmable circuitry 1112 of the illustrated example is hardware. For example, the programmable circuitry 1112 can be implemented by one or more integrated circuits, logic circuits, FPGAs, microprocessors, CPUs, GPUs, DSPs, and/or microcontrollers from any desired family or manufacturer. The programmable circuitry 1112 may be implemented by one or more semiconductor based (e.g., silicon based) devices. In this example, the programmable circuitry 1112 implements the example cross-device interaction circuitry 335.

The programmable circuitry 1112 of the illustrated example includes a local memory 1113 (e.g., a cache, registers, etc.). The programmable circuitry 1112 of the illustrated example is in communication with main memory 1114, 1116, which includes a volatile memory 1114 and a non-volatile memory 1116, by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117. In some examples, the memory controller 1117 may be implemented by one or more integrated circuits, logic circuits, microcontrollers from any desired family or manufacturer, or any other type of circuitry to manage the flow of data going to and from the main memory 1114, 1116.

The programmable circuitry platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user (e.g., a human user, a machine user, etc.) to enter data and/or commands into the programmable circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1100 of the illustrated example also includes one or more mass storage discs or devices 1128 to store firmware, software, and/or data. Examples of such mass storage discs or devices 1128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1132, which may be implemented by the machine readable instructions of FIGS. 6, 7, and/or 8, may be stored in the mass storage device 1128, in the volatile memory 1114, in the non-volatile memory 1116, and/or on at least one non-transitory computer readable storage medium such as a CD or DVD which may be removable.

Figure 12:
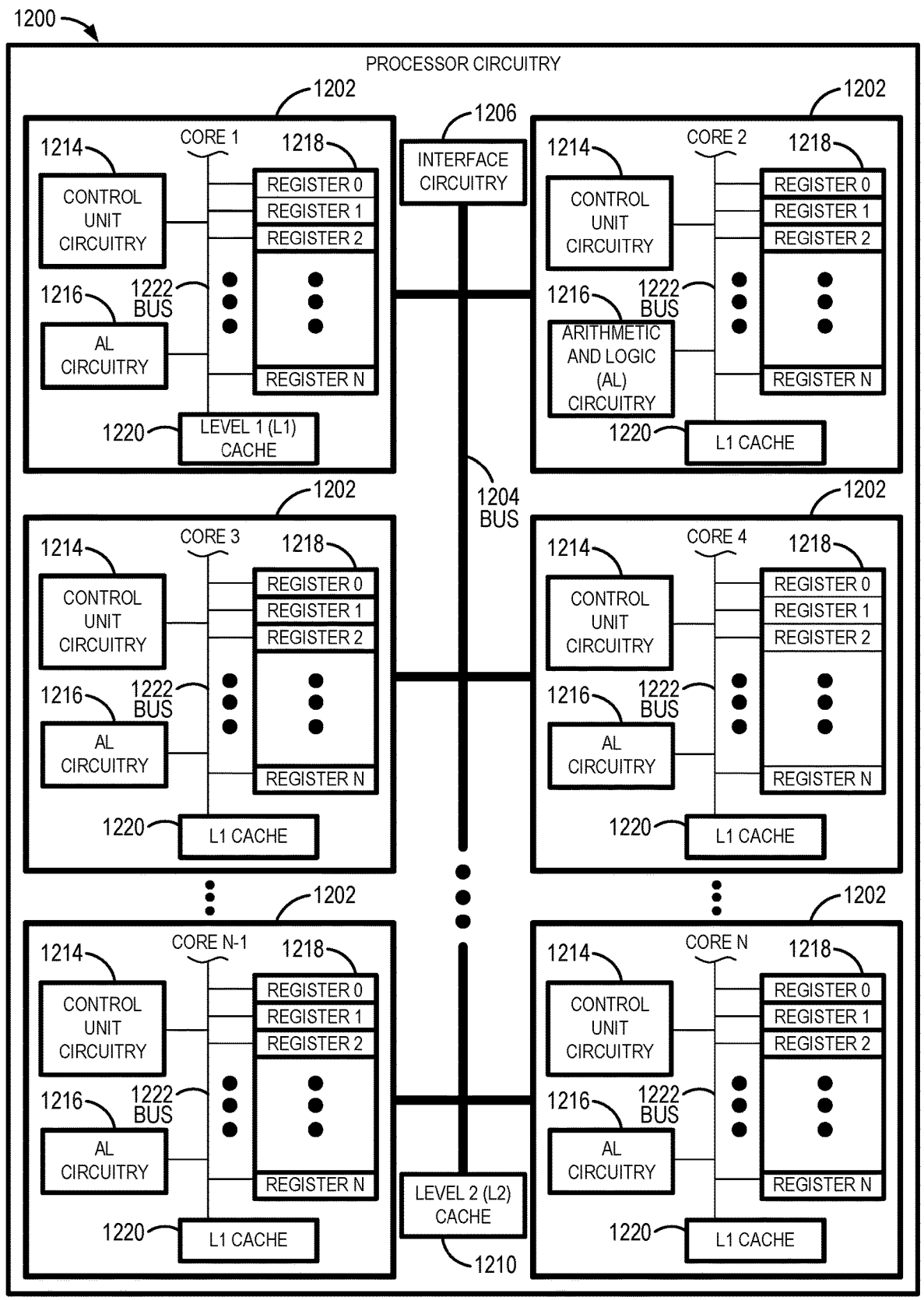
FIG. 12 is a block diagram of an example implementation of the programmable circuitry of FIG. 11.

FIG. 12 is a block diagram of an example implementation of the programmable circuitry 1112 of FIG. 11. In this example, the programmable circuitry 1112 of FIG. 11 is implemented by a microprocessor 1200. For example, the microprocessor 1200 may be a general-purpose microprocessor (e.g., general-purpose microprocessor circuitry). The microprocessor 1200 executes some or all of the machine-readable instructions of the flowcharts of FIGS. 6, 7, and/or 8 to effectively instantiate the circuitry of FIG. 3 as logic circuits to perform operations corresponding to those machine readable instructions. In some such examples, the circuitry of FIG. 3 is instantiated by the hardware circuits of the microprocessor 1200 in combination with the machine-readable instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 6, 7, and/or 8.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating-point operations. In yet other examples, the AL circuitry 1216 may include first AL circuitry that performs integer-based operations and second AL circuitry that performs floating-point operations. In some examples, the AL circuitry 1216 may be referred to as an Arithmetic Logic Unit (ALU).

The registers 1218 are semiconductor-based structures to store data and/or instructions such as results of one or more of the operations performed by the AL circuitry 1216 of the corresponding core 1202. For example, the registers 1218 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure, such as by being distributed throughout the core 1202 to shorten access time. The second bus 1222 may be implemented by at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages.

The microprocessor 1200 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1200, in the same chip package as the microprocessor 1200 and/or in one or more separate packages from the microprocessor 1200.

Figure 13:
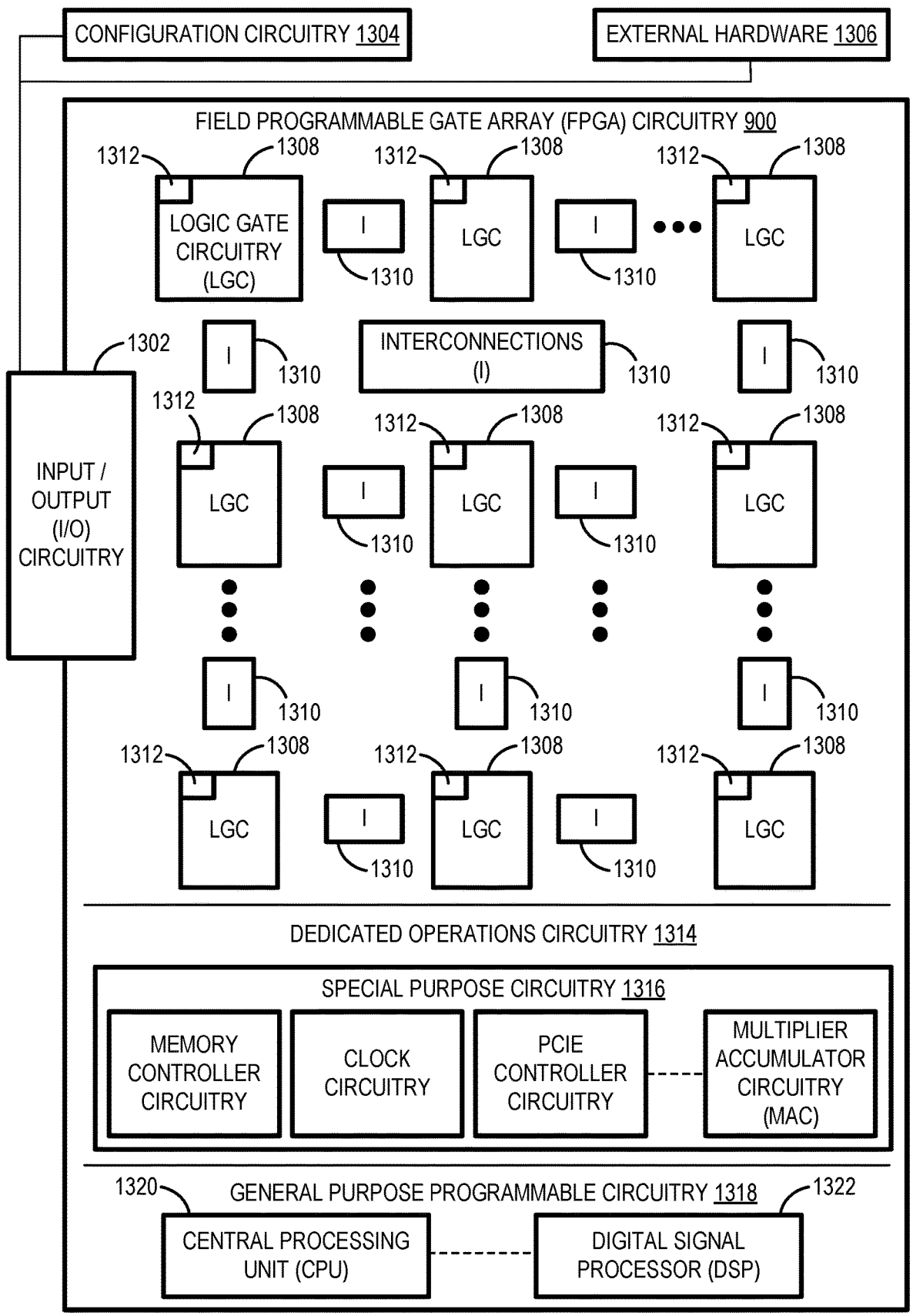
FIG. 13 is a block diagram of another example implementation of the programmable circuitry of FIG. 11.

FIG. 13 is a block diagram of another example implementation of the programmable circuitry 1112 of FIG. 11. In this example, the programmable circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1200 of FIG. 12 described above (which is a general purpose device that may be programmed to execute some or all of the machine readable instructions represented by the flowchart(s) of FIGS. 6, 7, and/or 8 but whose interconnections and logic circuitry are fixed once fabricated), the FPGA circuitry 1300 of the example of FIG. 13 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 6, 7, and/or 8. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 6, 7, and/or 8. As such, the FPGA circuitry 1300 may be configured and/or structured to effectively instantiate some or all of the operations/functions corresponding to the machine readable instructions of the flowchart(s) of FIGS. 6, 7, and/or 8 as dedicated logic circuits to perform the operations/functions corresponding to those software instructions in a dedicated manner analogous to an ASIC. Therefore, the FPGA circuitry 1300 may perform the operations/functions corresponding to the some or all of the machine readable instructions of FIGS. 6, 7, and/or 8 faster than the general-purpose microprocessor can execute the same.

In the example of FIG. 13, the FPGA circuitry 1300 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1300 of FIG. 13 may access and/or load the binary file to cause the FPGA circuitry 1300 of FIG. 13 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1300 of FIG. 13 to cause configuration and/or structuring of the FPGA circuitry 1300 of FIG. 13, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1300 of FIG. 13 may access and/or load the binary file to cause the FPGA circuitry 1300 of FIG. 13 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1300 of FIG. 13 to cause configuration and/or structuring of the FPGA circuitry 1300 of FIG. 13, or portion(s) thereof.

The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain a binary file, which may be implemented by a bit stream, data, and/or machine-readable instructions, to configure the FPGA circuitry 1300, or portion(s) thereof. In some such examples, the configuration circuitry 1304 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1306 may be implemented by external hardware circuitry. For example, the external hardware 1306 may be implemented by the microprocessor 1200 of FIG. 12.

The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations/functions that may correspond to at least some of the machine readable instructions of FIGS. 6, 7, and/or 8 and/or other desired operations. The logic gate circuitry 1308 shown in FIG. 13 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations/functions. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example dedicated operations circuitry 1314. In this example, the dedicated operations circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the programmable circuitry 1112 of FIG. 11, many other approaches are contemplated. For example, FPGA circuitry may include an on-board CPU, such as one or more of the example CPU 1320 of FIG. 12. Therefore, the programmable circuitry 1112 of FIG. 11 may additionally be implemented by combining at least the example microprocessor 1200 of FIG. 12 and the example FPGA circuitry 1300 of FIG. 13. In some such hybrid examples, one or more cores 1202 of FIG. 12 may execute a first portion of the machine readable instructions represented by the flowchart(s) of FIGS. 6, 7, and/or 8 to perform first operation(s)/function(s), the FPGA circuitry 1300 of FIG. 13 may be configured and/or structured to perform second operation(s)/function(s) corresponding to a second portion of the machine readable instructions represented by the flowcharts of FIGS. 6, 7, and/or 8, and/or an ASIC may be configured and/or structured to perform third operation(s)/function(s) corresponding to a third portion of the machine readable instructions represented by the flowcharts of FIGS. 6, 7, and/or 8.

It should be understood that some or all of the circuitry of FIG. 3 may, thus, be instantiated at the same or different times. For example, same and/or different portion(s) of the microprocessor 1200 of FIG. 12 may be programmed to execute portion(s) of machine-readable instructions at the same and/or different times. In some examples, same and/or different portion(s) of the FPGA circuitry 1300 of FIG. 13 may be configured and/or structured to perform operations/functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 1200 of FIG. 12 may execute machine readable instructions in one or more threads executing concurrently and/or in series. In some examples, the FPGA circuitry 1300 of FIG. 13 may be configured and/or structured to carry out operations/functions concurrently and/or in series. Moreover, in some examples, some or all of the circuitry of FIG. 3 may be implemented within one or more virtual machines and/or containers executing on the microprocessor 1200 of FIG. 12.

In some examples, the programmable circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the programmable circuitry 1112 of FIG. 11, which may be in one or more packages. For example, the XPU may include a CPU (e.g., the microprocessor 1200 of FIG. 12, the CPU 1320 of FIG. 13, etc.) in one package, a DSP (e.g., the DSP 1322 of FIG. 13) in another package, a GPU in yet another package, and an FPGA (e.g., the FPGA circuitry 1300 of FIG. 13) in still yet another package.

Figure 14:
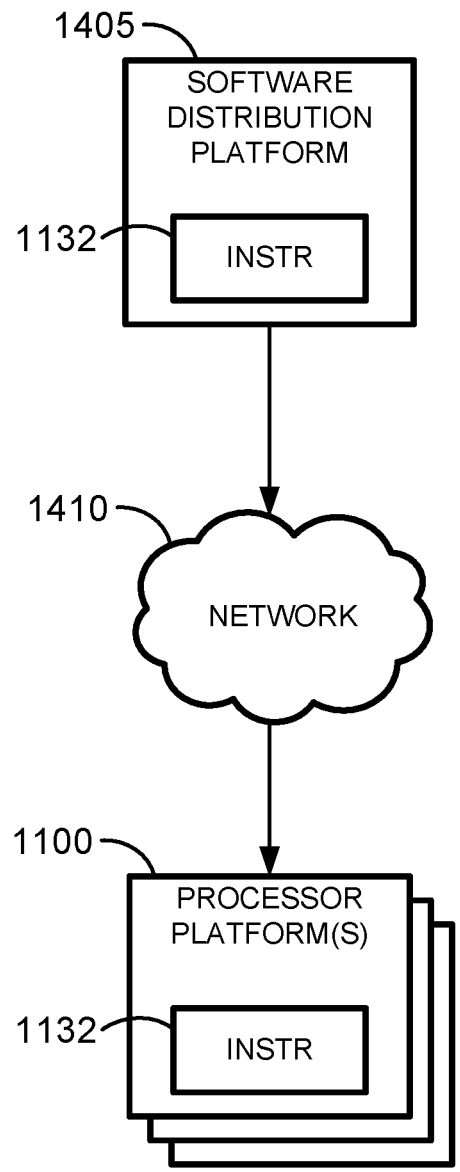
FIG. 14 is a block diagram of an example software/firmware/instructions distribution platform (e.g., one or more servers) to distribute software, instructions, and/or firmware (e.g., corresponding to the example machine readable instructions of FIGS. 6, 7, and/or 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to other hardware devices (e.g., hardware devices owned and/or operated by third parties from the owner and/or operator of the software distribution platform) is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions of FIGS. 6, 7, and/or 8, as described above. The one or more servers of the example software distribution platform 1405 are in communication with an example network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions of FIGS. 6, 7, and/or 8, may be downloaded to the example programmable circuitry platform 1100, which is to execute the machine readable instructions 1132 to implement the cross-device interaction circuitry 335. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that enable control of a host device from a remote device. Such control may include control of a portion (or all) of the display of a host device and/or control of specific content provided to the host device. Disclosed systems, apparatus, articles of manufacture, and/or methods improve the efficiency of using a computing device by reducing the need for additional peripherals and/or additional display devices to be attached to a host device to enable interaction with the same. For example, instead of adding an additional human input device (e.g., a touch screen) and/or sensors to a host device to enable rotation of a 3-dimensional object, the user may utilize a remote device (e.g., a smartphone) that is already equipped with a human input device to enable such interaction. Further, disclosed examples facilitate the transfer of data (e.g., a phone number, an email address, a website address, etc.) from a first device to a second device for use in an application on the second device (e.g., for making a phone call, sending an email, viewing a website). In this manner, the example approaches disclosed herein reduce the need for additional human input devices. Disclosed systems, apparatus, articles of manufacture, and methods are accordingly directed to one or more improvement(s) in the operation of machine(s) such as a computer, a telephone, a tablet, and/or other electronic and/or mechanical device(s).

Example methods, apparatus, systems, and articles of manufacture to facilitate user interaction across multiple computing systems are disclosed herein. Further examples and combinations thereof include the following:

Example 1 includes an apparatus to facilitate user interaction across computing systems, the apparatus comprising interface circuitry, machine readable instructions, and programmable circuitry to at least one of instantiate or execute the machine readable instructions to cause content to be provided to a host computing system to present the content via a display, access an edit instruction from a user of the apparatus, the edit instruction to cause a change of the content, and cause the edit instruction to be provided to the host computing system to apply the change to the content presented on the display.

Example 2 includes the apparatus of example 1, wherein the interface circuitry is to obtain an identifier for the content from the host computing system.

Example 3 includes the apparatus of example 2, wherein the edit instruction is to include the identifier.

Example 4 includes the apparatus of example 2, wherein the programmable circuitry is to cause communication of an intent to edit message to the host computing system, wherein the intent to edit message includes the identifier.

Example 5 includes the apparatus of example 1, wherein the programmable circuitry is to initiate establishment of a connection between the apparatus and the host computing system.

Example 6 includes the apparatus of example 1, wherein the change includes at least one of a change in a rotation, tilt, or location of a displayed three-dimensional object.

Example 7 includes the apparatus of example 1, wherein the apparatus is implemented by a personal electronic device and the host computing system is implemented by a personal computer.

Example 8 includes a non-transitory machine readable storage medium comprising instructions to cause programmable circuitry to at least cause content to be provided to a host computing system to present the content via a display, access an edit instruction from a user, the edit instruction to cause a change of the content, and cause the edit instruction to be provided to the host computing system to apply the change to the content presented on the display.

Example 9 includes the non-transitory machine readable storage medium of example 8, wherein the host computing system is to provide an identifier for the provided content.

Example 10 includes the non-transitory machine readable storage medium of example 9, wherein the edit instruction is to include the identifier.

Example 11 includes the non-transitory machine readable storage medium of example 9, wherein the instructions are to cause communication of an intent to edit message to the host computing system, wherein the intent to edit message includes the identifier.

Example 12 includes the non-transitory machine readable storage medium of example 8, wherein the instructions are to cause the programmable circuitry to initiate establishment of a connection to the host computing system.

Example 13 includes the non-transitory machine readable storage medium of example 8, wherein the change includes at least one of a change in a rotation, tilt, or location of a displayed three-dimensional object.

Example 14 includes the non-transitory machine readable storage medium of example 8, wherein the programmable circuitry is implemented at a personal electronic device and the host computing system is implemented by a personal computer.

Example 15 includes a method for facilitation of user interaction across computing systems, the method comprising providing content to a host computing system to present the content via a display, accessing, by executing an instruction with at least one processor, an edit instruction from a user, the edit instruction to cause a change to the content, and providing, by executing an instruction with the at least one processor, the edit instruction to the host computing system to apply the change to the content presented on the display.

Example 16 includes the method of example 15, further including obtaining an identifier for the provided content from the host computing system.

Example 17 includes the method of example 16, wherein the edit instruction is to include the identifier.

Example 18 includes the method of example 16, further including communicating an intent to edit message to the host computing system, wherein the intent to edit message includes the identifier.

Example 19 includes the method of example 15, further including initiating establishment of a connection with the host computing system.

Example 20 includes the method of example 15, wherein the change includes at least one of a change in a rotation, tilt, or location of a displayed three-dimensional object.

Example 21 includes an apparatus to facilitate user interaction across computing systems, the apparatus comprising image capture circuitry, display circuitry, interface circuitry, machine readable instructions, and programmable circuitry to at least one of instantiate or execute the machine readable instructions to obtain an image of a display of a host computing system from the image capture circuitry, the host computing system separate from the apparatus, communicate the image of the display to the host computing system, prompt a user to accept a proposed region of interest, the proposed region of interest identified based on the image of the display, in response to acceptance of the proposed region of interest, access a stream of the proposed region of interest from the host computing system, and display the stream of the proposed region of interest via the display circuitry.

Example 22 includes the apparatus of example 21, wherein the programmable circuitry is to detect an interaction with the displayed stream, and communicate information about the detected interaction to the host computing system.

Example 23 includes the apparatus of example 22, wherein content of the displayed stream is to be edited by a remote device separate from the apparatus.

Example 24 includes the apparatus of example 23, wherein the host computing system is to provide a first stream to the apparatus representing a first region of interest of the display of the host computing system, and the host computing system is to provide a second stream to the remote device representing a second region of interest of the display of the host computing system, the second region of interest different from the first region of interest.

Example 25 includes the apparatus of example 24, wherein the first region of interest and the second region of interest at least partially overlap.

Example 26 includes an apparatus to facilitate user interaction across computing systems, the apparatus comprising interface circuitry, machine readable instructions, and programmable circuitry to at least one of instantiate or execute the machine readable instructions to accessing an image of content from a host device, analyzing the image of the content to detect an identifier within the content, and provide the identifier to an application executed by the programmable circuitry.

Example 27 includes the apparatus of example 26, wherein the identifier includes at least one of an email address, a telephone number, or a uniform resource locator.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to facilitate user interaction across computing systems, the apparatus comprising:
   interface circuitry;
   machine readable instructions; and
   programmable circuitry to at least one of instantiate or execute the machine readable instructions to:
   identify content to be provided to a remote computing system, the content identified based on a portion of a display of the apparatus captured by the remote computing system;
   cause content to be provided to the remote computing system to present the content via a remote display of the remote computing system;
   access an edit instruction from a user of the apparatus, the edit instruction to cause a change of the content; and
   cause information corresponding to the edit instruction to be provided to the remote computing system to apply the change to the content presented on the remote display.

2. The apparatus of claim 1, wherein the interface circuitry is to obtain an identifier for the content from the remote computing system.

3. The apparatus of claim 2, wherein the edit instruction is to include the identifier.

4. The apparatus of claim 2, wherein the programmable circuitry is to cause communication of an intent to edit message to the remote computing system, wherein the intent to edit message includes the identifier.

5. The apparatus of claim 1, wherein the programmable circuitry is to initiate establishment of a connection between the apparatus and the remote computing system.

6. The apparatus of claim 1, wherein the change includes at least one of a change in a rotation, tilt, or location of a displayed three-dimensional object.

7. The apparatus of claim 1, wherein the apparatus is implemented by a personal computer and the remote computing system is implemented by a personal electronic device.

8. A non-transitory machine readable storage medium comprising instructions to cause programmable circuitry to at least:
   identify content to be provided to a remote computing system, the content identified based on a portion of a display of a computing system captured by the remote computing system;
   cause content to be provided to the remote computing system to present the content via a remote display of the remote computing system;
   access an edit instruction from a user, the edit instruction to cause a change of the content; and
   cause information corresponding to the edit instruction to be provided to the remote computing system to apply the change to the content presented on the remote display.

9. The non-transitory machine readable storage medium of claim 8, wherein the remote computing system is to provide an identifier for the provided content.

10. The non-transitory machine readable storage medium of claim 9, wherein the edit instruction is to include the identifier.

11. The non-transitory machine readable storage medium of claim 9, wherein the instructions are to cause communication of an intent to edit message to the remote computing system, wherein the intent to edit message includes the identifier.

12. The non-transitory machine readable storage medium of claim 8, wherein the instructions are to cause the programmable circuitry to initiate establishment of a connection to the remote computing system.

13. The non-transitory machine readable storage medium of claim 8, wherein the change includes at least one of a change in a rotation, tilt, or location of a displayed three-dimensional object.

14. The non-transitory machine readable storage medium of claim 8, wherein the programmable circuitry is implemented at a personal computer and the remote computing system is implemented by a personal electronic device.

15. A method for facilitation of user interaction across computing systems, the method comprising:
   identifying, by executing an instruction with at least one processor, content to be provided to a remote computing system, the content identified based on a portion of a display of a computing system captured by the remote computing system;
   providing the content to the remote computing system to present the content via a remote display of the remote computing system;
   accessing, by executing an instruction with the at least one processor, an edit instruction from a user, the edit instruction to cause a change to the content; and
   providing, by executing an instruction with the at least one processor, information corresponding to the edit instruction to the remote computing system to apply the change to the content presented on the remote display.

16. The method of claim 15, further including obtaining an identifier for the provided content from the remote computing system.

17. The method of claim 16, wherein the edit instruction is to include the identifier.

18. The method of claim 16, further including communicating an intent to edit message to the remote computing system, wherein the intent to edit message includes the identifier.

19. The method of claim 15, further including initiating establishment of a connection with the remote computing system.

20. The method of claim 15, wherein the change includes at least one of a change in a rotation, tilt, or location of a displayed three-dimensional object.

* * * * *